(12) United States Patent
Di Leo

(10) Patent No.: US 8,985,878 B2
(45) Date of Patent: Mar. 24, 2015

(54) SYSTEM FOR CAMERA STABILIZATION

(71) Applicant: The Alba Group, Ltd, Sun Valley, CA (US)

(72) Inventor: Mario F. Di Leo, Van Nuys, CA (US)

(73) Assignee: The Alba Group, Ltd., Sun Valley, CA (US)

( * ) Notice: Subject to any disclaimer, the term of this patent is extended or adjusted under 35 U.S.C. 154(b) by 0 days.

(21) Appl. No.: 14/103,755

(22) Filed: Dec. 11, 2013

(65) Prior Publication Data
US 2014/0099092 A1 Apr. 10, 2014

Related U.S. Application Data

(63) Continuation-in-part of application No. 13/646,346, filed on Oct. 5, 2012, now Pat. No. 8,657,507.

(60) Provisional application No. 61/627,691, filed on Oct. 17, 2011.

(51) Int. Cl.
G03B 17/00 (2006.01)
G03B 17/56 (2006.01)
F16M 13/04 (2006.01)
F16M 11/10 (2006.01)
F16M 11/20 (2006.01)

(52) U.S. Cl.
CPC ............... G03B 17/56 (2013.01); F16M 13/04 (2013.01); F16M 11/10 (2013.01); F16M 11/2042 (2013.01); F16M 11/2092 (2013.01); G03B 17/561 (2013.01); G03B 17/563 (2013.01); F16M 2200/044 (2013.01)
USPC .......................................................... 396/422

(58) Field of Classification Search
CPC ............................... G03B 17/56; F16M 13/04
USPC .................................. 396/420, 421; 352/243
See application file for complete search history.

(56) References Cited

U.S. PATENT DOCUMENTS 2,746,369 A   5/1956   Beard et al.
2,873,645 A   2/1959   Horton
2,945,428 A   7/1960   Dearborn
(Continued)

FOREIGN PATENT DOCUMENTS

JP   2003259180 A   9/2003

OTHER PUBLICATIONS

International Search Report, ISA/KR, Mar. 7, 2013, pp. 1-7.

Primary Examiner — Clayton E Laballe
Assistant Examiner — Noam Reisner
(74) Attorney, Agent, or Firm — Fulwider Patton LLP

(57) ABSTRACT

A rig for supporting a camera. A left rod and a right rod, each rod extending generally forwards and having a front end and a back end. Each rod configured to be operably connected to the other rod via a support structure that is configured for supporting a camera, each rod having a sliding element configured to operably connect each rod to the support structure, each sliding element being configured to be moveable towards and, alternatingly, away from the back end. Each rod is equipped with a spring positioned to bias each sliding element toward a registration position in relation to the back end, so that forward movement of the sliding element from the registration position develops a backward bias in the spring, and backward movement of the sliding element from the registration position develops a forward bias in the spring.

17 Claims, 19 Drawing Sheets

(56) References Cited

U.S. PATENT DOCUMENTS

| | | |
|---|---|---|
| 3,044,346 A | 7/1962 | Fieux |
| 3,332,593 A | 7/1967 | Fauser |
| 3,900,140 A | 8/1975 | Kelso et al. |
| 4,017,168 A | 4/1977 | Brown et al. |
| 4,037,763 A | 7/1977 | Turchen |
| 4,082,436 A | 4/1978 | Gottschalk |
| 4,091,975 A | 5/1978 | Russell |
| 4,206,983 A * | 6/1980 | Nettman et al. .............. 352/243 |
| 4,244,500 A | 1/1981 | Fournier |
| 4,437,753 A | 3/1984 | Dunn et al. |
| 4,526,308 A | 7/1985 | Dovey |
| 4,542,966 A | 9/1985 | Knaudt |
| RE32,138 E | 5/1986 | Gottschalk |
| 4,727,390 A | 2/1988 | Brown |
| 4,943,820 A | 7/1990 | Larock |
| 4,963,904 A | 10/1990 | Lee |
| 5,073,788 A | 12/1991 | Lingwall |
| 5,294,947 A | 3/1994 | Harrington |
| 5,305,034 A | 4/1994 | Aratani |
| 5,332,136 A | 7/1994 | Rudolph |
| 5,360,196 A | 11/1994 | Digiulio et al. |
| 5,397,041 A | 3/1995 | Bruseker |
| 5,424,791 A | 6/1995 | Campbell |
| 5,435,515 A | 7/1995 | Diguilio et al. |
| 5,454,042 A | 9/1995 | Drever et al. |
| 5,513,784 A | 5/1996 | Pretorius |
| 5,612,756 A | 3/1997 | Kardach |
| 5,787,317 A | 7/1998 | Robinson |
| 5,890,025 A | 3/1999 | Hart |
| 6,056,449 A | 5/2000 | Hart et al. |
| 6,068,223 A | 5/2000 | Navarro |
| 6,457,880 B1 | 10/2002 | Slot et al. |
| 6,641,010 B2 | 11/2003 | Greene |
| 6,764,231 B1 | 7/2004 | Shubert |
| 6,929,409 B2 | 8/2005 | DeSorbo et al. |
| 7,000,879 B2 | 2/2006 | Gonzales |
| 7,097,368 B2 | 8/2006 | Gonzales |
| 7,293,924 B2 | 11/2007 | DeSorbo et al. |
| 7,372,502 B2 | 5/2008 | Gonzalez |
| 7,922,401 B2 | 4/2011 | McKay |
| 8,206,045 B2 | 6/2012 | Sweeney et al. |
| 2004/0223753 A1 | 11/2004 | Gale |
| 2010/0266270 A1 | 10/2010 | Pizzo et al. |
| 2011/0080564 A1 * | 4/2011 | Taylor .......................... 352/243 |

* cited by examiner

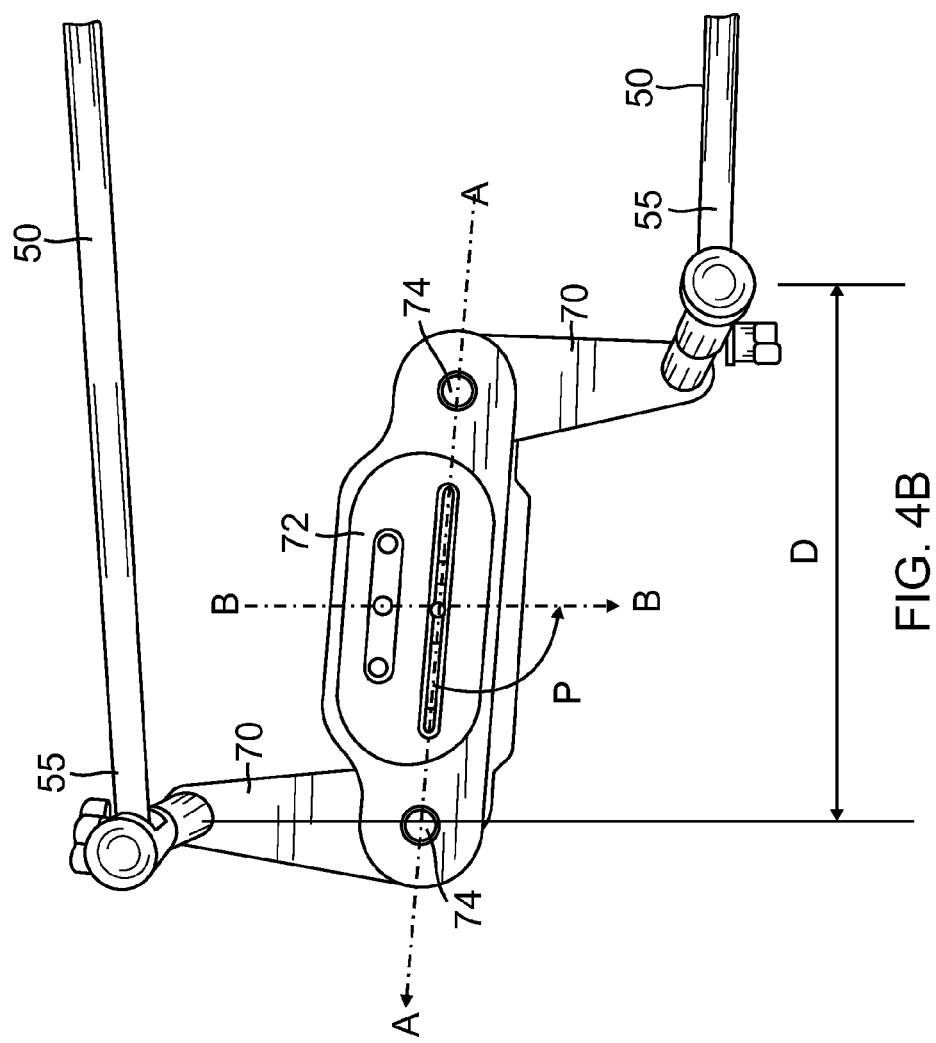

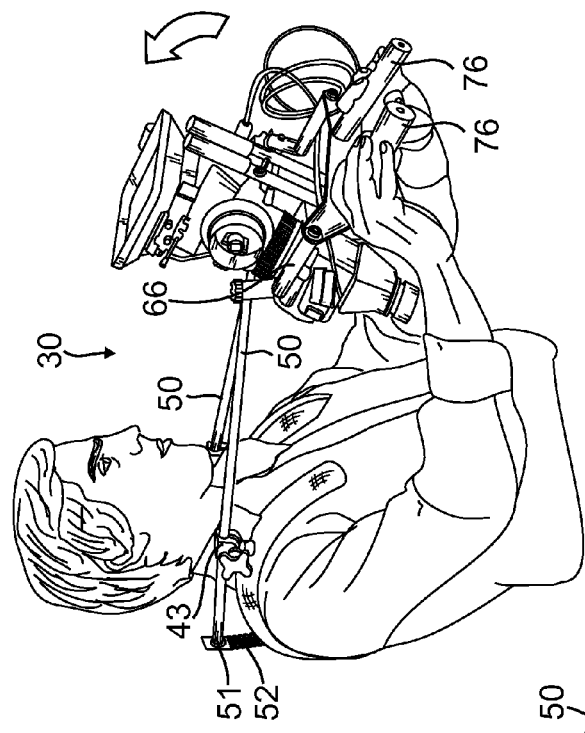
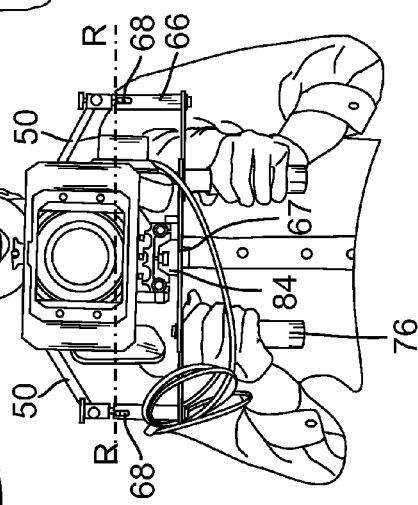
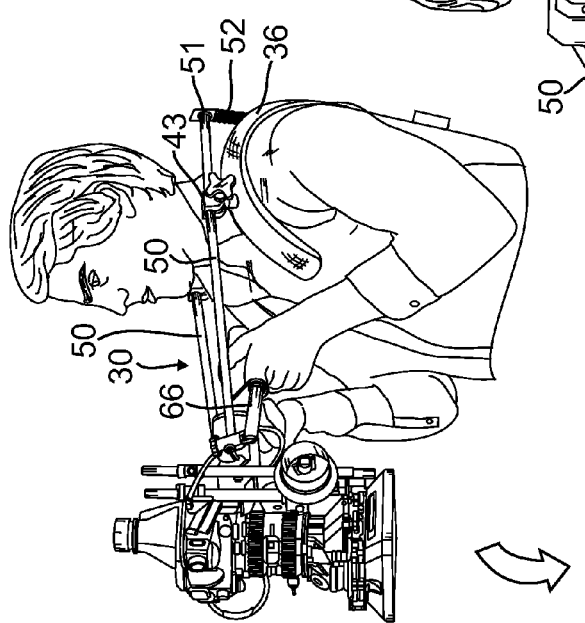
FIG. 8A
FIG. 8B
FIG. 8C

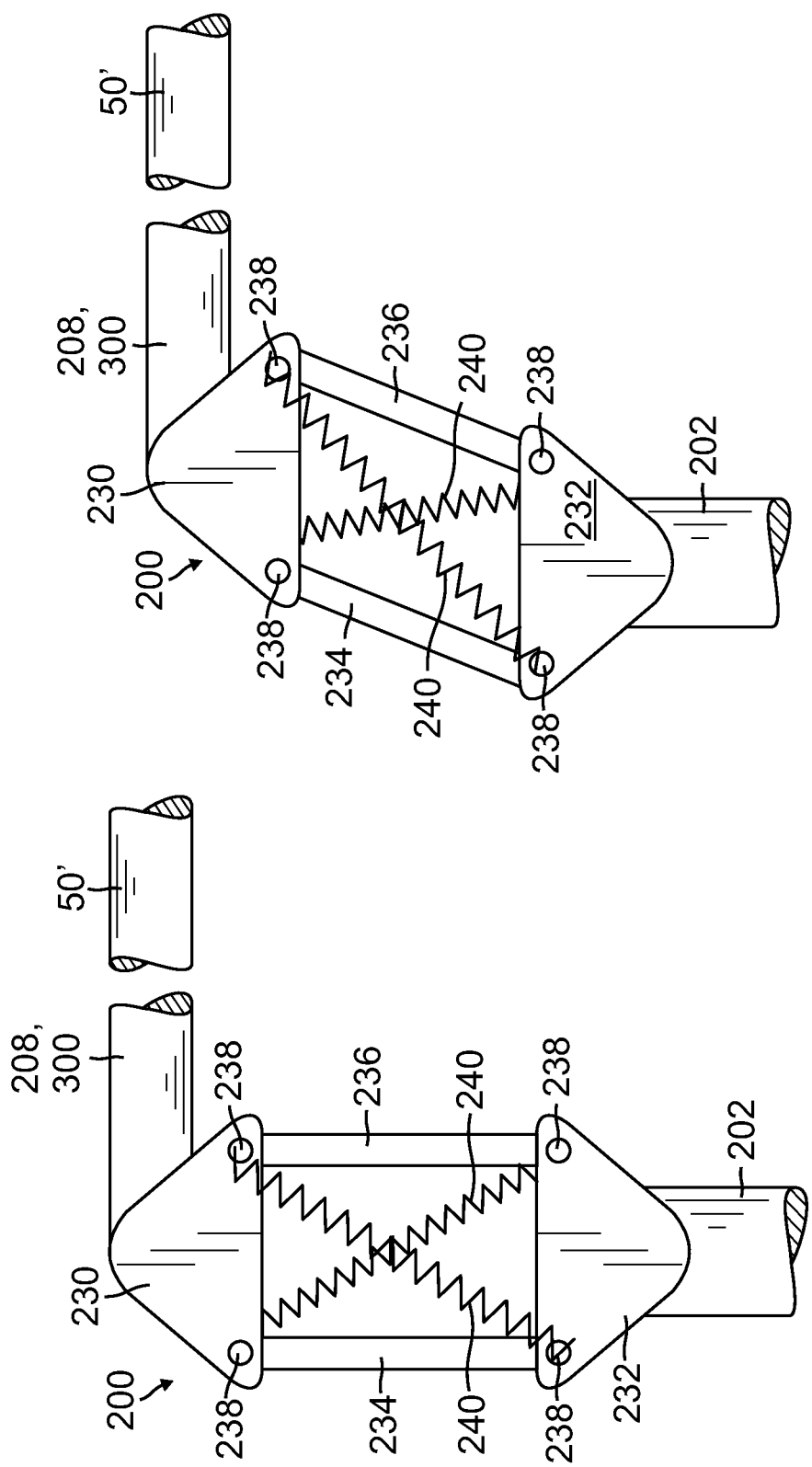

SYSTEM FOR CAMERA STABILIZATION

CROSS-REFERENCES TO RELATED APPLICATIONS

This application is a continuation-in-part that claims benefit from U.S. application Ser. No. 13/646,346 filed Oct. 5, 2012 which claims benefit from U.S. Application No. 61/627,691, filed Oct. 17, 2011, all of which are incorporated by reference in their entirety.

BACKGROUND

The present invention relates generally to photographic equipment and more particularly to a system for stabilizing a mobile camera relative to its main support means, in this example a cameraman's body, while at the same time permitting the cameraman to manipulate and maneuver the camera with dexterity. Hand held cameras, both movie cameras and still cameras, are subject to undesirable motion from the body of a cameraman which results in unacceptable images. It is, therefore, desirable to stabilize the camera position, reduce to a minimum the transfer of body motion to the camera, and to permit the camera to be under stabilized control by the cameraman under both stationary and mobile conditions.

Prior proposed stabilizing devices for photographic camera equipment or other like devices have included various types of apparatus carried by the cameraman to facilitate stabilizing control of the camera.

However, generally speaking, prior art hand controlled and stabilized camera mounting apparatus, while vastly improving stabilization of the camera and isolating the camera from unwanted motions of the cameraman's body, still include problems of precise control of the camera position relative to the cameraman's body without imposing undue stress or strain on the cameraman. One of the problems confronting cameramen using prior art systems is that they still require an excessive amount of body movement and orientation to capture the desired image. While it is feasible for the cameraman to orient his body to obtain a desired image, to do so for extended periods while shooting movie images becomes an excessive strain on the cameraman's body. In short, presently known stabilization systems do not give the cameraman sufficient flexibility and control over the camera to allow twisting and rotation about multiple axes simultaneously.

Thus there is a need in the art to solve these problems by making camera support and stabilization systems more flexible and giving a greater range of camera orientations. The present invention addresses these and other problems.

SUMMARY OF THE INVENTION

The present invention is a system for camera stabilization, or, a rig for supporting a camera. In preferred embodiments, the rig comprises two shoulder supports, each configured to fit over a shoulder of a user and each being operably connected to the other. Two elongate rods extend generally forwards, each rod having a front end and a back end, wherein, each rod is located to pivotingly rotate about a pivot point between the front end and the back end, the pivot point on each rod being supported by a respective shoulder support. In some embodiments, the front end of each rod is operably connected to the front end of the other rod via a support structure that is configured for supporting a camera. In some embodiments, the support structure comprises three elongate plates connected to each other in series, namely, a left plate, a center plate, and a right plate, wherein each of two opposite ends of the center plate are connected by first pin joints to an inner end of each of the left plate and the right plate respectively, the first pin joints being configured to permit rotation of the plates in a horizontal plane. An outer end of each of the left plate and the right plate is operably connected to the front end of each rod respectively by second pin joints, the second pin joints being configured to permit rotation of the three plates in a horizontal plane, such that the three plates are configured to be movable by the user to form a desired articulated shape.

In some embodiments, the rig may further include two downwardly extending elongate handles that are connected to the support structure, whereby movement of the handles by a user is capable of altering the articulated shape of the support structure. Each handle may be connected to the support structure at a location of one of the first pin joints respectively. Furthermore, each handle may be configured in relation to each of the first pin joints such that axial rotation of each handle causes a threaded pin in the respective first pin joint to rotate and, temporarily, to frictionally lock the center plate to a respective left plate or right plate.

In some embodiments, the rig may include two downwardly extending hangers, each hanger having an upper end and a lower end, each hanger upper end being operably connected by a third pin-joint to the front end of one of the rods, to permit rotation of each hanger backwards or forwards in a vertical plane extending substantially parallel with the rods, and wherein each hanger lower end is connected by the second pin-joint to the left or right plate respectively. Each third pin-joint between rod and hanger may include a threaded pin that is configured to be rotable to temporarily lock the third pin-joint against rotation.

In some embodiments, the rig may further include a number of springs being at least one spring having an upper end and a lower end, the upper end being operably connected to at least one rod, the lower end being connected to an anchor that is operably connected to and held immovable in relation to the shoulder supports. In other embodiments, the number of springs is at least two springs, each spring being configured to extend from the back end of one of the rods respectively to the anchor, each spring being configured to provide a force to pivotingly bias the front end of each rod respectively generally upwards. Here, each spring may be oriented in relation to the rig to include a component of orientation that is horizontal, whereby the upper end of each spring applies a vector component of force that biases the back end of each rod respectively to move horizontally inwards towards a vertical symmetry line of the rig, and also pivotingly biases the front end of each rod respectively to move horizontally outwards away from the symmetry line.

In some embodiments of the invention, each rod may be positioned to pivotingly rotate about a pivot situated between the front end and the back end, each pivot being supported by a respective shoulder support, and further wherein, the rods are configured so that one rod is substantially independently movable in relation to the other rod. Here, a number of springs being at least one spring having an upper end and a lower end may be provided, the upper end being operably connected to at least one rod, the lower end being connected to an anchor that is operably connected to and held immovable in relation to the shoulder supports. In some embodiments, the number of springs may be at least two springs, each spring being configured to extend from the back end of one of the rods respectively to the anchor, each spring being configured to provide a force to pivotingly bias the front end of each rod respectively generally upwards. In some embodiments, each pivot is configured to provide each rod at least three degrees of freedom in relation to the pivot, namely: vertical rotation about the pivot; horizontal rotation about the pivot; and, sliding motion through the pivot. In further embodiments, each pivot may be configured to provide each rod with a fourth degree of freedom in relation to the pivot, namely, twisting motion about an axis of the rod. Each pivot may define a cylindrical hole for slidably receiving each rod respectively, and each pivot may include a threaded pin passing through the pivot, the pin being rotatable to sequentially lock and unlock the pivot, whereby the pivot has an unlocked condition in which the rod may slide through the cylindrical hole, and a locked condition in which the rod is frictionally prevented from sliding through the cylindrical hole. In some embodiments, each pivot may include an elongate axle having an axis that extends generally vertically, the axle being fixed to one of the shoulder supports and being configured to be rotatable about the axis; and a receiver connected to an upper end of the axle by a pin-joint configured to permit rotation of the receiver in a vertical plane, the receiver defining the cylindrical hole for receiving the rod. In other embodiments, each pivot includes a ball that is fixed to one of the shoulder supports; and a socket configured to receive the ball and to rotate about the ball both about a horizontal axis and about a vertical axis, the socket defining the cylindrical hole for receiving the rod.

In some embodiments of the invention, the rig may include two shoulder supports, each configured to fit over a shoulder of a user and each being operably connected to the other, and two extender elements, each extender element connected to a shoulder support respectively and extending downwardly. A belt may be provided for stabilizing the shoulder supports, the belt including a rigid skeleton, the belt being separated from the shoulder supports by a vertical distance. Two elongate rods may be provided, extending generally forwards, each rod having a front end and a back end and being configured to support a camera at the front end, wherein, each rod is positioned to pivotingly rotate about a pivot situated between the front end and the back end, each pivot being supported by a respective shoulder support. A number of springs may be provided being at least one spring having an upper end and a lower end, the upper end being operably connected to at least one rod, the lower end being connected to an anchor that is operably connected to the rigid skeleton. Each extender element may be configured to slidingly pass through the rigid skeleton, and further wherein each extender element may include a registration pin for locking a position of the extender element in relation to the skeleton, whereby, the vertical distance may be adjusted to a desired amount.

In some embodiments, the number of springs may be at least two springs, each spring being configured to extend from the back end of one of the rods respectively to the anchor, each spring being configured to provide a force to pivotingly bias the front end of each rod respectively generally upwards. In some embodiments, each spring may be oriented in relation to the rig to include a component of orientation that is horizontal, whereby the upper end of each spring applies a vector component of force that biases the back end of each rod respectively to move horizontally inwards towards a symmetry line of the rig, and also pivotingly biases the front end of each rod respectively to move horizontally outwards away from the symmetry line.

In some embodiments, the anchor may slidingly pass through the skeleton, the anchor including a registration pin for locking the position of the anchor in relation to the skeleton, whereby the anchor may be adjustable in a vertical direction in relation to the shoulder supports, and further whereby, tension in the at least one spring may be adjusted.

In some embodiments of the invention, the rig includes a support structure that is horizontally aligned and configured to support a camera, the support structure having two opposite ends and being suspended from two hangers, each hanger having an upper end and a lower end, the upper end of each hanger being operably connected by a first pin joint to the front end of each rod respectively, the lower end of each hanger being connected to one of the two ends of the support structure respectively. The support structure may be configured to rotate about an axis passing through the first pin joints. In some embodiments, two downwardly extending elongate handles may be provided that are connected to the support structure whereby movement of the handles by a user is capable of rotating the support structure about the axis. In some embodiments, the support structure comprises three elongate plates connected to each other in series, namely, a left plate, a center plate, and a right plate, wherein each of two opposite ends of the center plate are connected by second pin-joints to an inner end of each of the left plate and the right plate respectively, the second pin joints being configured to permit rotation of the plates in a horizontal plane. An outer end of each of the left plate and the right plate is connected to the lower end of each of the hangers respectively by a third pin-joint in a horizontal plane, whereby the three plates are configured to be movable by the user to form a desired articulated shape. In some embodiments, each handle is connected to the support structure at a location of one of the two second pin joints respectively, and each handle may be configured in relation to each of the second pin joints such that axial rotation of each handle causes a threaded pin in the respective second pin joint to rotate and, temporarily, to frictionally lock the center plate to a respective left plate or right plate.

In some embodiments of the invention, the rig may include two shoulder supports, each configured to fit over a shoulder of a user and each being operably connected to the other. Two elongate rods may be provided, extending generally forwards, each rod having a front end and a back end, and being configured to support a camera at the front end. Each rod may be positioned to pivotingly rotate about a pivot situated between the front end and the back end, each pivot being supported by a respective shoulder support; and further wherein, each rod is configured in relation to each respective pivot so that each rod enjoys at least three degrees of freedom, namely, vertical rotation about the pivot, horizontal rotation about the pivot, and sliding motion through the pivot. A number of springs being at least one spring having an upper end and a lower end may be provided, the upper end being operably connected to at least one rod, the lower end being connected to an anchor that is operably connected to, and held immovable in relation to, the shoulder supports. In some embodiments, the number of springs is at least two springs, each spring being configured to extend from the back end of one of the rods respectively to the anchor and each spring is configured to provide a force to pivotingly bias the front end of each rod respectively generally upwards. In some embodiments, each rod may be configured in relation to each respective pivot so that each rod enjoys a fourth degree of freedom, namely twisting about an axis of the rod. In some embodiments, each rod is configured in relation to each respective pivot so that the three degrees of freedom enjoyed by one rod are substantially independent of the three degrees of freedom enjoyed by the other rod.

In some embodiments of the invention, the rig may include a support structure having opposite ends and being configured to support a camera, wherein each opposite end is connected to each rod respectively at a connection point on each rod. Each rod may be located to pivotingly rotate about one of two pivots located, respectively, between the front end and the back end of each rod, each pivot being supported by a respective shoulder support. Each pivot may be configured to provide each respective rod with movement under at least one degree of freedom selected from a group of three degrees of freedom, namely: vertical rotation about the pivot; horizontal rotation about the pivot; and, sliding motion backwards and, alternatingly, forwards through the pivot by which the rod is capable of moving the connection point closer to the pivot and, alternatingly, further from the pivot respectively. Moreover, the at least one degree of freedom provided to one rod corresponds with the degree of freedom that is provided to the other rod, and further wherein, movement of one rod under the at least one degree of freedom is substantially independent of the movement of the other rod under a corresponding degree of freedom.

In other embodiments, each pivot may be configured to provide each respective rod with movement under at least two degrees of freedom selected from the group of three degrees of freedom. Here, movement of one rod under each of the at least two degrees of freedom is substantially independent of the movement of the other rod under corresponding degrees of freedom.

In yet other embodiments, each pivot may be configured to provide each respective rod with movement under the three degrees of freedom selected from the list of three degrees of freedom. Here, movement of one rod under each of the three degrees of freedom is substantially independent of the movement of the other rod under corresponding degrees of freedom.

As will be apparent from the detailed description herein below, having two rods for supporting a camera that possess such independence of motion from each other as described, gives the cameraman using the present invention great versatility and dexterity in positioning the camera in a great number of positions that are not possible in prior art camera stabilization systems.

In further embodiments, the invention is a rig for supporting a camera comprising two shoulder supports, each shoulder support being configured to fit over a shoulder of a user. A left rod and a right rod are provided, each rod extending generally forwards and having a front end and a back end. Each rod is located to pivotingly rotate about one of two pivots located between the front end and the back end of each rod respectively, each pivot being supported by a respective shoulder support. Each rod is configured to be operably connected to the other rod via a support structure that is configured for supporting a camera.

In some embodiments, each rod may have a first sliding element configured to operably connect each rod to the support structure, each first sliding element being configured to be moveable towards and, alternatingly, away from the back end. Further, each rod is equipped with a spring positioned to bias each first sliding element toward a registration position in relation to the back end, so that forward movement of the first sliding element from the registration position develops a backward bias in the spring, and backward movement of the first sliding element from the registration position develops a forward bias in the spring. In some embodiments, each rod is equipped with a dashpot positioned in parallel with each spring, whereby each dashpot is configured to damp motion of the first sliding element in relation to the registration position. In further embodiments, each rod is configured so that each first sliding element is free to rotate in relation to the back end about an axis extending along the rod. In some embodiments, each first sliding element includes a cylinder.

In some embodiments, a rig may include a left vertical extension and a right vertical extension, each vertical extension having a first end and a second end and being operably connected to each respective rod via the first end, each vertical extension having a second sliding element configured to be moveable towards and, alternatingly, away from the first end, each second sliding element being configured to operably connect to the support structure. Further, each vertical extension is equipped with a spring positioned to bias each second sliding element toward a registration position in relation to the first end, so that downward movement of the second sliding element from the registration position develops an upward bias in the spring, and upward movement of the second sliding element from the registration position develops a downward bias in the spring. In some embodiments, each vertical extension may be equipped with a dashpot positioned in parallel with each spring, whereby each dashpot is configured to damp motion of the second sliding element in relation to the registration position. In other embodiments, each vertical extension may be configured so that each second sliding element is free to rotate in relation to the first end about an axis extending along the vertical extension. In further embodiments, each second sliding element includes a cylinder.

In yet other embodiments, a rig may include a left horizontal extension and a right horizontal extension, each horizontal extension operably connected to each front end, each horizontal extension extending horizontally toward a point between the two rods and having an inside end which is proximate to the point and an outside end which is remote from the point, each horizontal extension having a third sliding element configured to be moveable towards and, alternatingly, away from the outside end, each third sliding element being configured to operably connect to the support structure. Further, each horizontal extension is equipped with a spring positioned to bias each third sliding element toward a registration position in relation to the outside end, so that outward movement of the third sliding element from the registration position develops an inward bias in the spring, and inward movement from the registration position develops an outward bias in the spring. In some embodiments, each horizontal extension may be equipped with a dashpot positioned in parallel with each spring, whereby each dashpot is configured to damp motion of the third sliding element in relation to the registration position. In further embodiments, each horizontal extension is configured so that each third sliding element is free to rotate in relation to each respective outside end about an axis extending along the horizontal extension. In yet further embodiments, each third sliding element includes a cylinder. In even further embodiments, the rig includes a left cup and a right cup, each cup connected to each respective horizontal extension and having an opening configured to receive a handle of the support structure.

In yet other embodiments, a rig may include a left vertical element and a right vertical element operably connected to each front end respectively, each vertical element having a first end and a second end, each vertical element operably connected at the first end to a respective rod via a pin joint to permit the vertical element to pivotingly rotate in a plane extending vertically and backwards and forwards. The support structure may be operably connected to the second end of each vertical element. In some embodiments, the left vertical element and the right vertical element each include a four bar linkage. In some of these embodiments, each four bar linkage includes at least one spring configured to bias the four bar linkage toward an equilibrium configuration. In yet further embodiments, a left horizontal extension and a right horizontal extension are provided, each horizontal extension being operably connected to the second end of each vertical element respectively. In some embodiments, each horizontal extension is configured to be free to rotate in relation to each respective vertical extension about an axis extending along the horizontal extension. In some embodiments, the rig may include a left cup and a right cup, each cup connected to each respective horizontal extension and having an opening configured to receive a handle of the support structure. In some of these embodiments, each cup may be configured to be free to rotate in relation to each respective horizontal extension about an axis extending longitudinally along an axis of the cup.

These and other advantages will become apparent upon reading the detailed description of preferred embodiments in conjunction with the drawings.

BRIEF DESCRIPTION OF THE DRAWINGS

FIG. 4B is a top detail view of the apparatus of FIG. 1, showing a second condition.

FIGS. 8A-C are sequential perspective views of the apparatus of FIG. 1, showing the apparatus in fifth, sixth, and seventh, conditions.

FIG. 13 is a detail view of a four bar linkage used in some embodiments of the invention, shown in a first condition.

FIG. 14 is a detail view of the four bar linkage seen in FIG. 13, shown in a second condition.

DETAILED DESCRIPTION OF THE PREFERRED EMBODIMENTS

Figure 1:
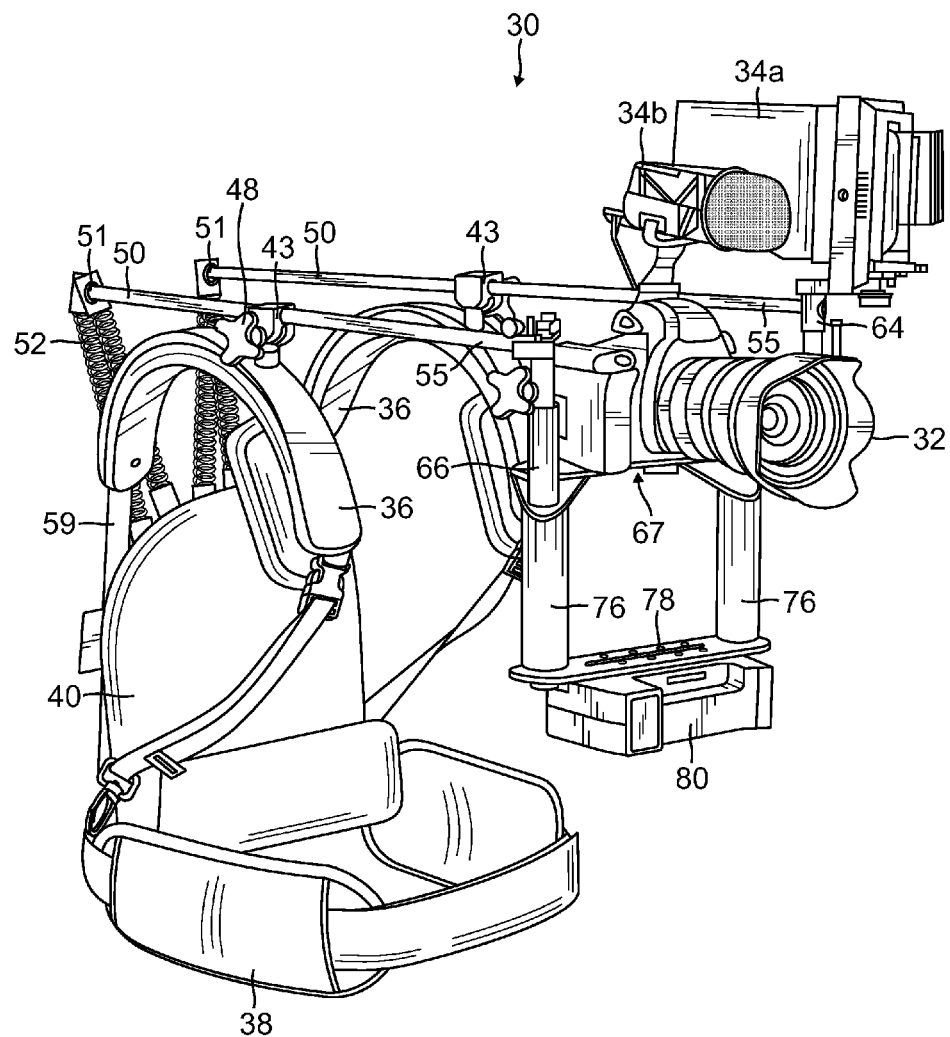
FIG. 1 is a perspective view of an apparatus having features of an embodiment of the invention.

This specification describes, with reference to the drawings, preferred embodiments of the invention. In FIG. 1, a camera is shown in conjunction with an embodiment of the rig apparatus of the invention. However, in subsequent figures, the camera has been removed for greater clarity of the rig apparatus and its components. It will be appreciated that the other figures, where appropriate, are to be envisaged with a camera, such as is shown in FIG. 1.

Referring first to FIG. 1, an embodiment of a rig having features of the invention is indicated by reference numeral 30, the rig being adapted to be worn by a cameraman to facilitate maneuvering a camera 32 and related equipment 34*a*, 34*b* while stabilizing the position of the camera in relation to the cameraman when he is walking, turning, running or moving up and down steps. As later described in more detail, such freedom of movement of the camera 32 requires stabilization of the position of the camera in a spaced forward relation from the cameraman while at the same time permitting the cameraman to orient the camera, in relation to himself and the object being photographed, with great dexterity and with a wide range of movement.

As used herein, the terms "apparatus" and "rig" are used interchangeably. Further, the term "operably connected," when used to describe two elements being "operably connected," is intended to include the possibility that intervening structure may be included between the two elements, so that the two elements may be connected to each other via the intervening structure. However, the term is not intended to mean that intervening structure must necessarily be included between the elements. Moreover, the terms of orientation that are used herein, backwards, forwards, sideways etc. are to be understood in relation to the orientation of a cameraman wearing the rig 30 and standing erect. Also, "inner" means towards a vertical line of symmetry of the rig, and "outer" means away from a vertical line of symmetry of the rig, which symmetry line may be envisaged with reference to FIG. 3.

In general, the rig 30 comprises a pair of curved shoulder supports 36 configured to rest comfortably and securely on the shoulders of a user, or cameraman/woman. The shoulder supports 36 are in turn operably connected to a supportive belt 38, which may include a padded back brace 40. The combined shoulder supports, belt, and brace, are configured to be immovable in relation to each other when the rig is in use (they may be movably adjusted before they are placed on the cameraman), but they support a number of movable parts that are configured to provide the cameraman with dexterity in orienting the camera while at the same time supporting and stabilizing the camera.

Figure 2A:
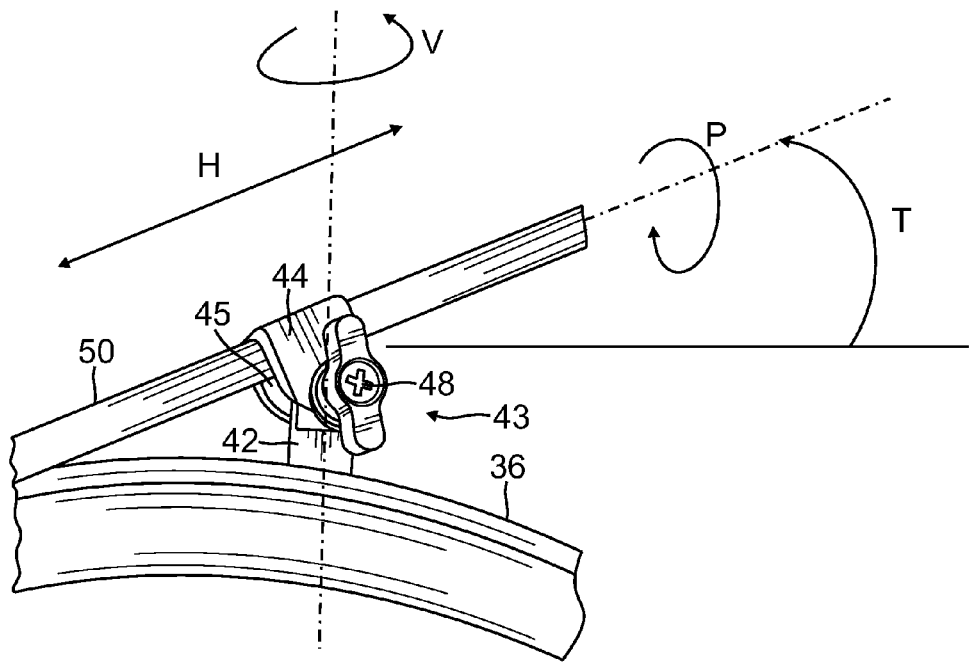
FIG. 2A is a side detail view of an aspect of the apparatus of FIG. 1.
Figure 2B:
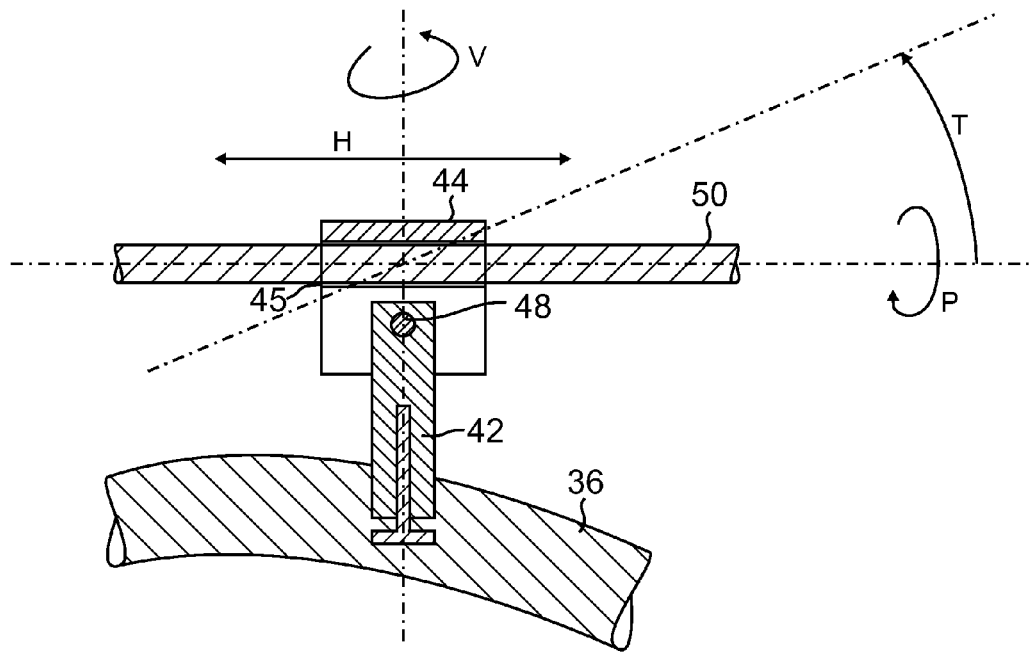
FIG. 2B is a sectional view through the detail of FIG. 2A.

With reference to FIGS. 2A and 2B, at or near the apex of each shoulder support 36, a pivot 43 is formed. In some embodiments, the pivot 43 comprises an axle 42 which is connected, and extends upwardly from, the respective shoulder support. Each axle 42 is configured in relation to the respective shoulder support to rotate about an axis extending upwardly through the axle, as indicated by the arrow V in FIGS. 2 and 2B. To each axle 42 is attached a slide receiver 44 which defines a cylindrical hole 45 passing through the slide receiver. A rotatable screw 48 passes through both the axle 42 and the slide receiver 44, thereby securing the axle to the slide receiver. An elongate cylindrical slide rod 50 passes through the cylindrical hole 45 in each slide receiver 44, and is sized to slide backwards and forwards through the hole as indicated by the arrow H in FIGS. 2A and 2B. The slide receiver is configured to rotate in a vertical plane in relation to the pivot axle 42 as indicated by the arrow T in FIG. 2. The rod may also be configured to twist about an elongate axis of the rod, as indicated by the arrow P in FIGS. 2A and 2B. The pivot 43 is configured so that sufficient rotation of the screw 48 will reduce the size of the hole 45 and lock the rod 50 against sliding movement, and against twisting rotation.

Figure 2C:
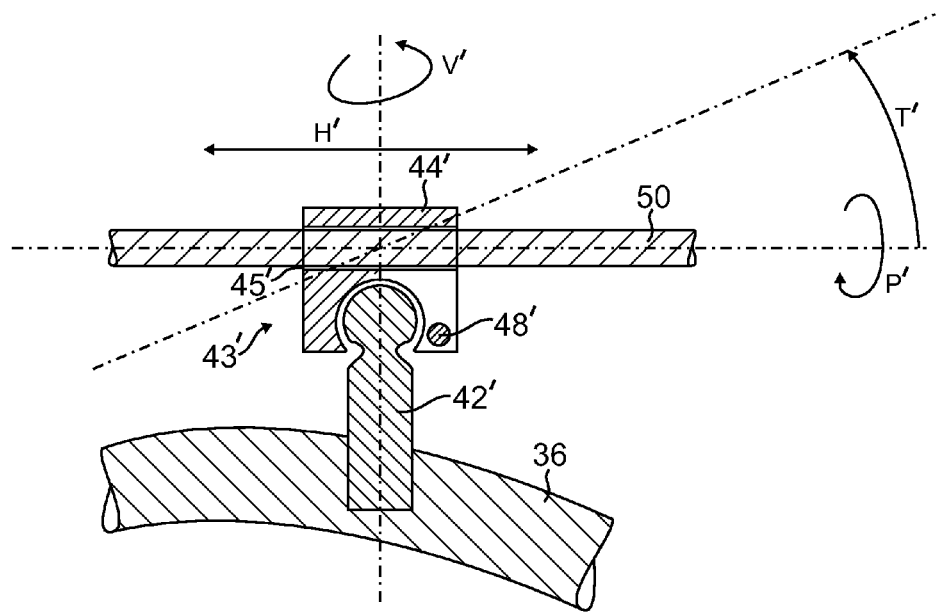
FIG. 2C is a sectional view through an alternative embodiment of the detail of FIG. 2A.

In another embodiment as exemplified in FIG. 2C, a pivot 43' comprises a ball 42' which is connected to, and extends upwardly from, the respective shoulder support. Each ball 42' is configured to mate with a socket 44' configured to receive and hold the ball. Each socket 44' defines a cylindrical hole 45' passing through the socket. An elongate cylindrical rod 50 passes through the cylindrical hole 45' in each socket, and is sized to slide backwards and forwards through the hole as indicated by the arrow H' in FIG. 2C. The socket is configured to rotate about a horizontal axis as indicated by the arrow T', and is also configured to rotate about a vertical axis as indicated by the arrow V' in FIG. 2C. The socket may also be configured to twist about an elongate axis of the rod, as indicated by the arrow P' in FIG. 2C. A rotatable screw 48' passes through the socket. The pivot 43' is configured so that sufficient rotation of the screw 48' will reduce the size of the hole 45' and lock the rod 50 against sliding movement, and against twisting rotation.

Thus, in some embodiments, the rig has a configuration that may allow the cameraman to move the rods 50 with up to four degrees of freedom in relation to the shoulder supports 36. First, he may pivot each rod 50 in a vertical plane in relation to the shoulder supports, as indicated by the arrows T and T'. Second he may rotate each rod horizontally in relation to the shoulder supports, as indicated by the arrows V and V'. Third, he may slide each rod backward and forward in relation to the shoulder supports when the pivot is not locked, as indicated by the arrows H and H'. Fourth, he may twist each rod about its own axis, when the pivot is not locked, as indicated by the arrows P and P'. Additionally, as will be set forth more fully below, in some embodiments movement under some of these degrees of freedom in motion may be applied by the cameraman to one rod substantially independently of any movement that is applied to the other rod.

By the term "substantially independently," it is meant that some relatively small movements, within the scope of the described structure may be given to one rod without imparting the same movement to the other rod. However, as will be evident from the description herein, the movements of the rods cannot be limitlessly independent of each other, to the extent that the front ends of the rods are operably connected to each other via the support structure 67 (described more fully below). Because the support structure may be made to change its shape, it allows a relatively large spatial envelope within which the front end of one rod may move in relation to the front end of the other rod while that other end of the rod is stationary. With regard to the rear ends of the rods, it will be appreciated that the rear end of one rod may move with substantial independence of the rear end of the other rod. Thus, the rods themselves, the front ends of the rods, and the rear ends of the rods, enjoy "substantial independence" of movement in relation to each other respectively, under any of up to four degrees of freedom, or combinations thereof. As will be seen, the wide range of movements afforded to the rods of the present invention, both absolutely and in relation to each other, provides a novel and highly advantageous dexterity in the way a cameraman may control the camera while it is supported by the rig 30.

Figure 3:
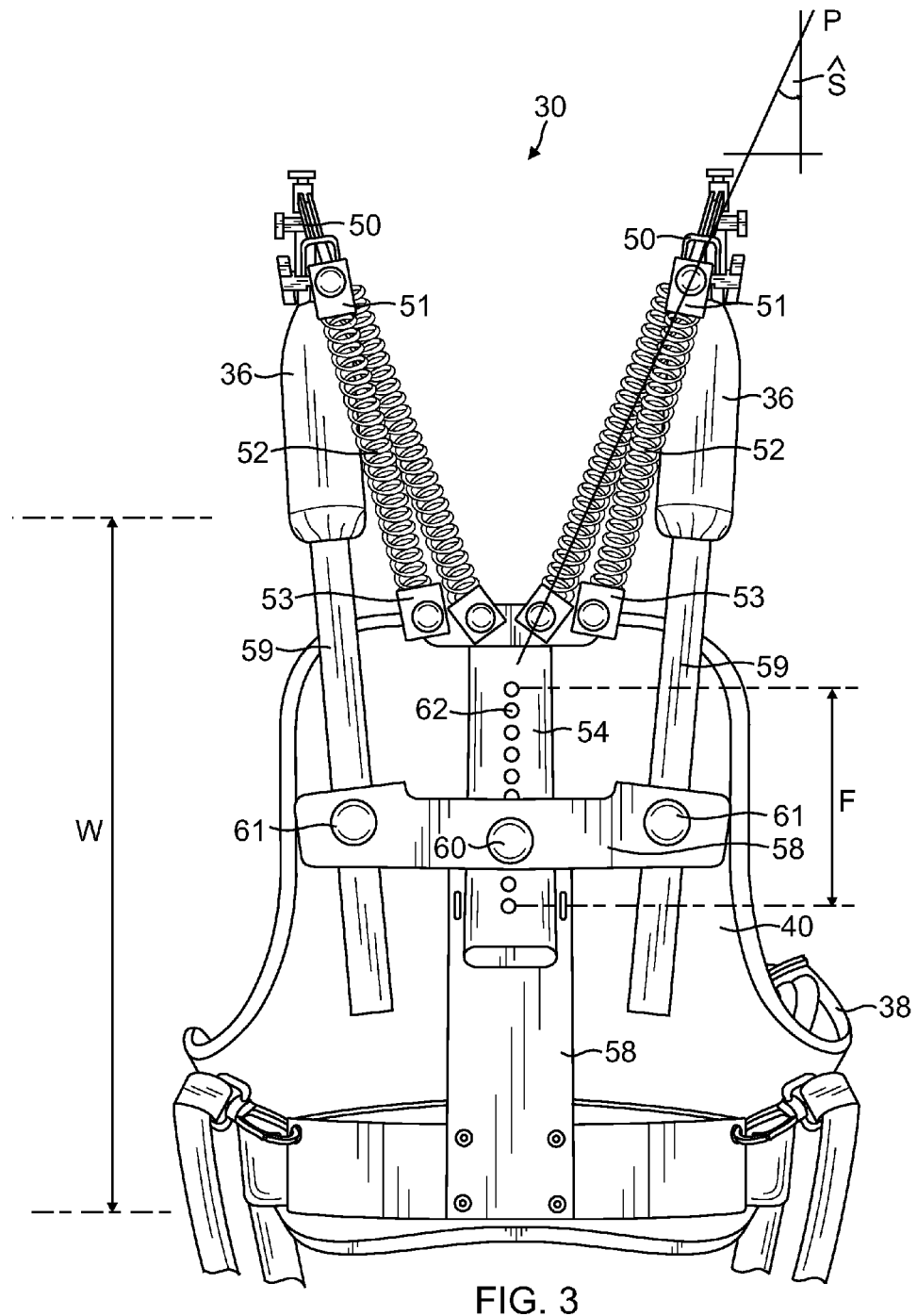
FIG. 3 is a rear elevation view of the apparatus of FIG. 1.

As may be understood with reference to FIG. 3, which is a rear view of one embodiment of the rig 30, the back end 51 of each rod 50 is attached to an upper end of at least one elongate spring 52 (helical metal or rubber tubes are preferred). In some embodiments, two springs may be attached to each rod, as shown in FIG. 3. A lower end 53 of each spring 52 is operably attached to an anchor 54. In some embodiments, the anchor may be configured to slide vertically in relation to a rigid skeleton structure 58 that is operably connected to the shoulder supports 36. The skeleton 58 is preferably made of metal, and may be removably attached to the back brace 40 and belt 38. A registration pin 60 may be provided to secure the anchor 54 against movement in relation to the skeleton. In one embodiment, the registration pin may be a set screw configured to either frictionally hold the anchor 54 in relation to the skeleton 58, or to enter one of a number of registration holes in the anchor for preventing movement of the anchor in relation to the skeleton. In another embodiment, the registration pin may be a spring loaded dowel configured to pass through a hole in both the skeleton 58 and the anchor 54. Where a registration dowel is used (as is exemplified in FIG. 3) at least one of the skeleton 58 and the anchor 54 may be provided with a plurality of registration holes 62 extending along a vertical line. Adjusting the registration between the anchor 54 and the skeleton 58, by selecting a desired registration hole 62 for the pin 60, will have the effect of adjusting the fixed position of the lower end of each spring 52 in relation to the height of the shoulder supports 36. This action will thereby adjust the range of movement permitted to the back end 51 of each rod 50, and hence, also the movement permitted to the front end of each rod. In a preferred embodiment, the overall travel of the anchor in relation to the skeleton may have a length "F" that is not less than 5 inches long, preferably between 5 inches and 10 inches long. In FIG. 3, the length F is shown as the extent of the registration holes. Where a friction set screw is used as the registration pin 60, no holes need be provided, but a travel length indicated by "F" will be provided over the length of the anchor 54 for frictional engagement.

Furthermore, in some embodiments, the distance between the shoulder supports 36 and the belt 38 (indicated as distance "W" in FIG. 3) may be adjusted to suit the particular physique of an individual cameraman. For example, in the case of a tall cameraman, the shoulder supports may be given a greater separation distance W from the waist belt. With reference to the embodiment shown in FIG. 3, this may be accomplished by the following exemplary structure. Extending downwardly from each shoulder support 36 is an elongate extender element 59. Each extender element 59 passes slidingly through a mating hole or detent (not visible in the figures) in the skeleton 58. A registration pin 61 is configured to secure the vertical position of the extender element 59 (and hence the shoulder support 36) in relation to the skeleton 58 (and hence the belt 38). The registration pin 61 may have the same configuration as the registration pin 60 used in conjunction with the anchor 54, in which case registration holes such as those described in the anchor 54 may be provided in the extender element 59. Once the cameraman has adjusted the setting "W" of the shoulder supports in relation to the belt to fit his physique by using the registration pins 61, he may then adjust the tension in the springs by adjusting the registration of the anchor 54 in relation to the skeleton 58 by using registration pin 60, as is described above. This double adjustment capability in the rig 30 imparts further advantages, because the rig can be custom fit to any cameraman while allowing the cameraman to maintaining a desired tension in the springs.

As exemplified in FIG. 3, in some embodiments, the springs 52 may be given a partially horizontal or sideways orientation. This has the result that, where at least one spring is oriented with an angle S to the vertical, the upper end of the spring will include an inward component of force (in addition to a downward component of force) applied to the back end 51 of the rod 50. By pivoting action, this in turn will provide an outward component of force to the front end 55 of the rod. The advantage of this aspect will be described further below.

Figure 6:
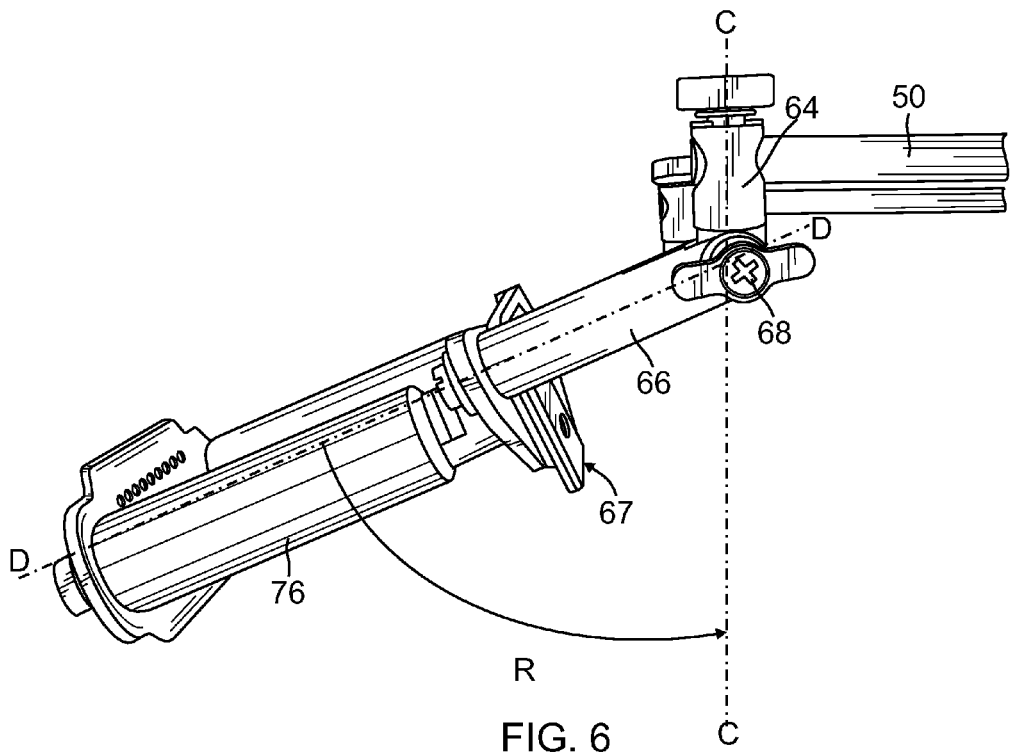
FIG. 6 is a side detail view of the apparatus of FIG. 1.

In some embodiments, as exemplified in FIG. 4A-FIG. 4C and FIG. 5, the front end 55 of each rod 50 may be attached to a downward extending stub 64. In some embodiments, the connection between the rod 50 and the downward stub 64 may be rigid. An elongate hanger 66 is connected to the lower end of each downward stub 64 by a threaded pin 68 in a pin joint that permits backward and forward rotation of the hanger 66 in relation to the downward stub 64, as indicated by the arrow R in FIG. 6. The pin 68 is configured in relation to the joint so that its inward rotation by the user will cause the joint to lock, until it is rotated outward again.

Extending between lower ends of each hanger 66 is a horizontal support structure 67 that is made up of three discrete plates, namely two outer plates 70 (left and right outer plates) and a center plate 72. The support structure is configured to receive and support a camera (as exemplified in FIGS. 1 and 8A-C) that may be held by a known screw means onto the center plate 72. An outer end of each outer plate is connected by a pin 71 (best seen in FIG. 5) providing a horizontal pin joint to one of the hangers 66, so that each outer plate 70 may freely rotate horizontally in relation to its respective hanger 66. An inner end of each outer plate 70 is connected to an end of a center plate 72. A lockable pin joint is provided between each outer plate 70 and the center plate 72 as follows: a threaded pin 74 passes through an overlapping portion between each outer plate 70 and the center plate 72, the pin being configured, in a first condition, to permit each outer plate to rotate horizontally in relation to the center plate. Each pin 74 passes downwardly and is connected to a handle 76. Rotation of each of the handles 76 about its elongate axis will fix the corresponding pin 74 in a second condition to frictionally lock the respective outer plate 70 to the center plate 72.

A first available function of the handles 76 is to permit the cameraman to rotate the camera about an axis R-R (best seen in FIG. 5 and FIGS. 8A-C) that extends horizontally between the two pins 68. The rotation, by angle "R," is also exemplified in FIG. 6, and it allows the cameraman to point the camera vertically downwards or vertically upwards as desired. As seen in FIGS. 8A-C, the angle R may extend from a maximum upwards to a minimum downwards in a range that exceeds 180 degrees. By simultaneously allowing the rods to tilt downwards while taking an upward shot, and to tilt upwards by taking a downward shot, this configuration also has the considerable advantage of permitting the cameraman to take upward looking shots from below of a subject without having to bend his back in order to align the camera upwardly from below. The cameraman may stand vertically, and by lowering the rods, his hands may push forwards on the handles 76 so that the camera lens points upwardly, from below. Equally, the cameraman may take a downward looking shot from above, by pushing the handles 76 upwards to elevate the front end of the rods, and pulling them backwards at the same time, the camera will orient itself correctly without the cameraman having to bend his back. All the while, the cameraman may review the contents of his camera screen by way of a digital viewing screen 34a attached to the front end of one of the rods, and for which the orientation to the cameraman remains substantially parallel with the rods, even if the camera is rotated by angle "R" in relation to the rods 50.

Figure 4A:
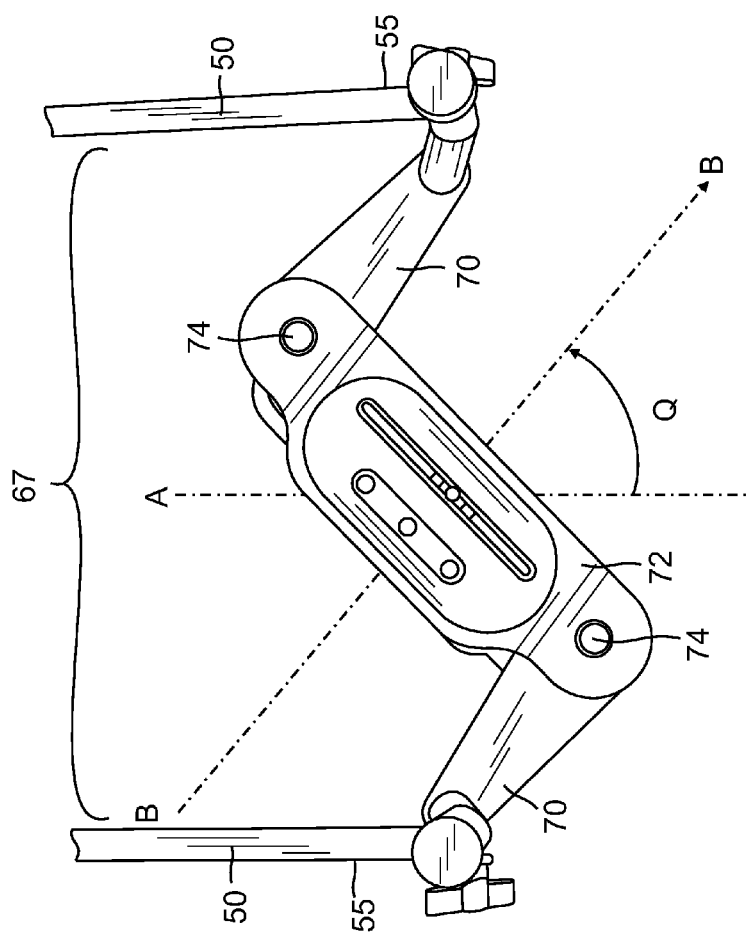
FIG. 4A is a top detail view of the apparatus of FIG. 1, showing a first condition.
Figure 4C:
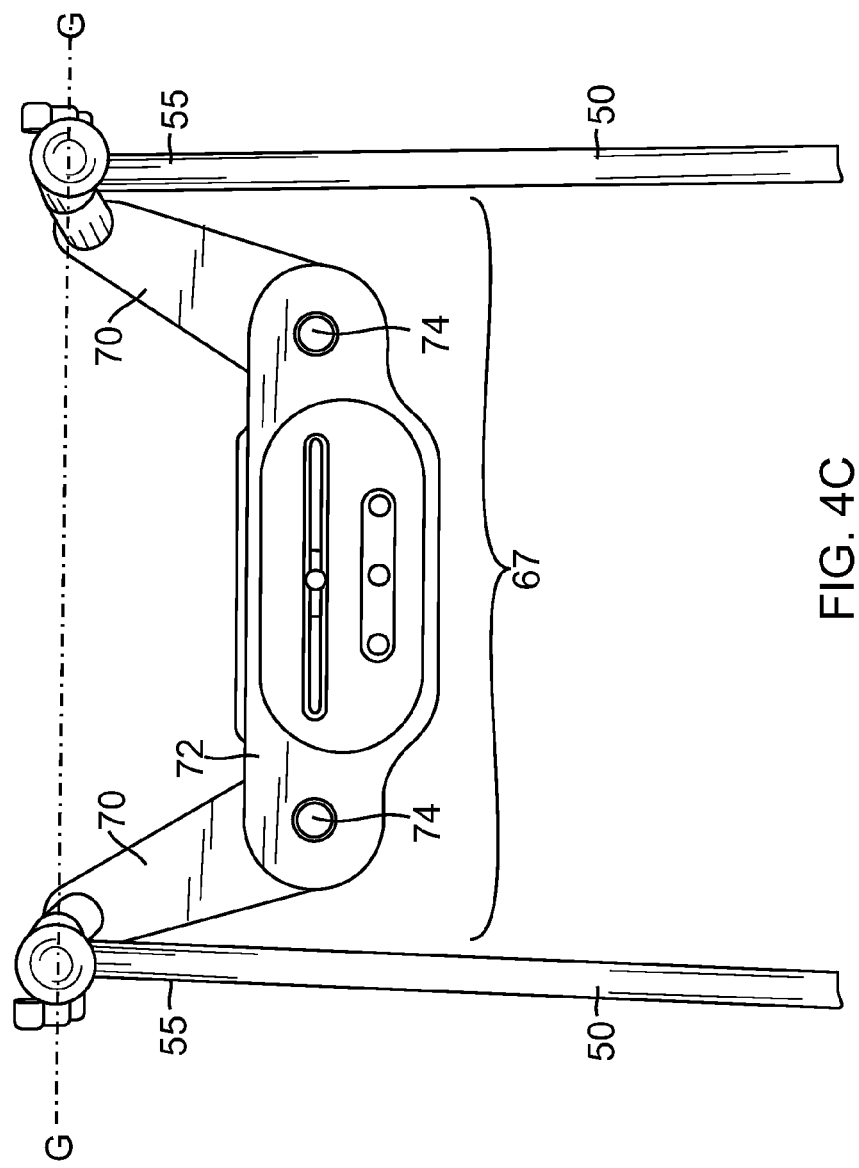
FIG. 4C is a top detail view of the apparatus of FIG. 1, showing a third condition.

A second available function of the handles 76 is to permit the cameraman to reconfigure the camera support structure 67 to have an articulated configuration in which an angle may be formed between the center plate 72 and each outer plate 70, as exemplified in FIGS. 4A-4C. As seen in FIG. 4A, this aspect allows the cameraman to rotate the camera about a vertical axis in relation to the rig 30. Where previously the camera lens may have pointed forward along an axis A-A as in FIG. 4A, the cameraman may, by moving the position of the handles 76, elect to rotate the camera lens by an angle Q in a horizontal plane about its vertical axis, to point the camera in a direction B-B that is offset sideways to the forward direction.

Moreover, if the cameraman desires to turn the camera at an angle approaching 90 degrees to a forward direction, as exemplified in FIG. 4B, he may do so by sliding one of the rods 50 forwards in its slide receiver 44 (or in its socket 44', depending on the embodiment), and sliding the other rod backwards, so that a distance "D," measured in a forward direction, separates the front ends 55 of the rods. This separation "D" creates a space that allows the cameraman to rotate the camera by an angle P which may be a full 90 degrees or even more, without the camera becoming into conflict with a downwardly extending hanger 66. In this regard, it will be appreciated that the capacity for axial movement of the rods 50 (arrow H in FIG. 2) in relation to each respective pivot 43, and particularly the capacity for differential axial movement of the rods in relation to each other, facilitates this advantageous configuration. Thus, the support structure 67 is operably connected, at opposing ends of the support structure, to each rod 50 at a connection point on each rod, wherein the connection point is longitudinally fixed in relation to the rod. (In the present example, the described connection point is the front end 55 of each rod.) The configuration as shown in FIG. 4B is enabled by the fact that each rod 50 is configured in relation to each pivot 43, 43' to enjoy a degree of freedom which allows each rod a sliding motion backwards and, alternatingly, forwards through the pivot by which the rod is capable of moving the connection point closer to the pivot and, alternatingly, further from the pivot respectively. Further, the movement of one rod under this degree of freedom is substantially independent of the movement of the other rod under a corresponding degree of freedom. The result is the configuration shown in FIG. 4B in which one rod, and also its connection point, is moved by a distance "D" further than the other rod and its connection point when measured in a forwards direction.

Figure 5:
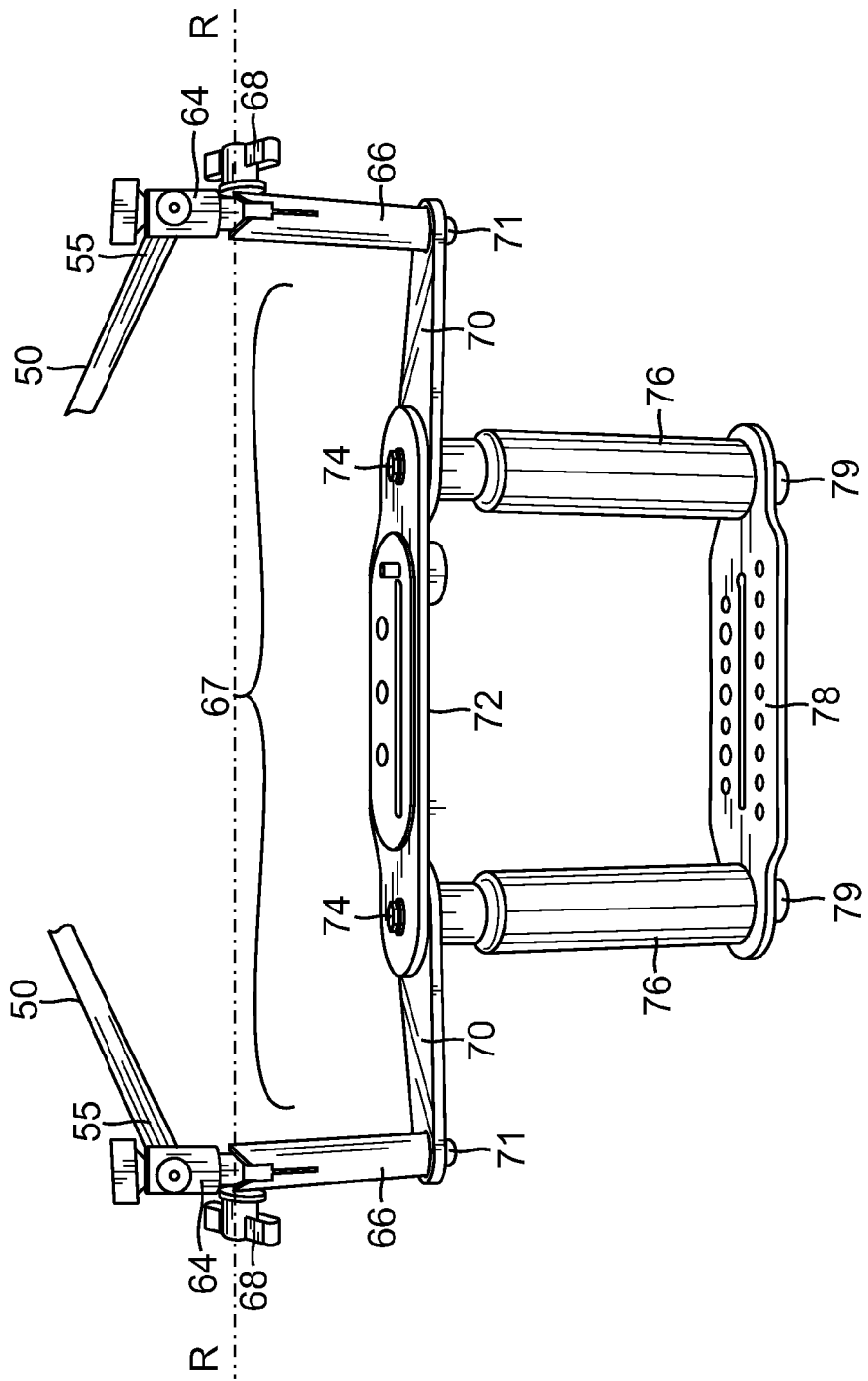
FIG. 5 is a front perspective view of features of the apparatus of FIG. 1.

Further, if the cameraman desires to adjust the distance of the camera from his body, for example to balance the camera without adjusting the pivoting length of the rods 50, he may move both handles backward or forward simultaneously by an equal distance, thereby imparting an advanced or retracted shape to the support structure 67. FIG. 4C exemplifies a retracted articulated shape of the support structure 67, in which the camera may be positioned closer to the cameraman's body without changing the orientation of the camera from a forward orientation. Another advantageous reason the cameraman may want to adjust the position of the camera backwards or forwards as exemplified for example in FIG. 4C, relates to rotation of the camera about axis R-R seen in FIG. 5. If, for example, the camera to be attached to the support structure 67 has a front-heavy center of gravity (for example, a center of gravity that is within the lens of the camera), then the cameraman may shift the center plate 72 backwards towards his body as exemplified in FIG. 4C. While the box of the camera will be attached to the center plate 72, leaving the lens extending over the front of the center plate, shifting the center plate backwards will cause the horizontal center of gravity of the camera to be adjusted to lie on top of the line identified as G-G in FIG. 4C—which is the "center of gravity line" which passes through the pins 71 (best seen in FIG. 5) by which the support structure 67 is operably supported by the front ends 55 of the rods 50. By adjusting the articulated configuration of the support structure 67, the camera's center of gravity along a horizontal axis may be positioned to coincide with the center of gravity line G-G. This is extremely advantageous when the cameraman unlocks the pins 68, for example, in preparation for rotating the camera about the axis R-R. For, without this feature, if the center of gravity of the camera were substantially removed from the center of gravity line G-G, then, in the event the cameraman accidentally let go of the handles, the camera would tend to flop forwards or backwards under the effect of gravity. However, under the principle of the present embodiment, adjusting the center of gravity of the camera, by adjusting the articulated shape of the support structure to coincide with center of gravity line G-G, avoids this result. The advantage may be increased if the camera is placed on the support structure 67, and its height is adjusted with a shim block 84 (exemplified in FIG. 8B), if necessary, so that the vertical center of gravity of the camera coincides with the axis of rotation R-R through the two pins 68, as indicated in FIGS. 5 and 8B. Thus, the center of gravity of the camera would coincide with both the horizontal center of gravity line G-G and the axis of rotation R-R. Under this configuration, if the cameraman rotates the camera through angle R (as exemplified in FIG. 6), and then accidentally lets go of the handles, the camera will not tend to rotate back under the influence of gravity to a downwardly hanging configuration (such as exemplified in FIG. 1), but will remain motionless in its rotated condition. Furthermore, under this configuration, the cameraman may smoothly rotate the camera by more than 180 degrees, from vertically upwards to vertically downwards (as exemplified in FIGS. 8A-C), without the camera tending develop any unwanted rotational force of its own under the influence of gravity. It will be appreciated that this advantage to the cameraman, of being able to arrange the camera's vertical center of gravity to coincide with the axis R-R, is enabled by configuring the support structure 67 to be displaced vertically downwards from the axis of rotation R-R. Thus, the vertical center of gravity of the camera, which may be perched on the support structure 67, can be adjusted to coincide with the axis R-R.

A third available function of the handles 76 is that they permit the cameraman to lock the camera support plate 67 in a selected angled configuration, such as exemplified in FIG. 4A to FIG. 4C, by rotating the handles about their own elongate axes. By rotating each handle, a threaded part of each pin 74 is driven to a locking position so that the center plate 72 is compressed against the outer plate 70 in a region of overlap, thereby frictionally preventing further rotation between the plates, until the handles 76 are once again rotated in the opposite direction.

A fourth available function of the handles 76 is that they permit the cameraman (preferably after he has unlocked pins 68) to slide both of the rods 50 forwards or backwards in their slide retainers 44 (or sockets 44'), to adjust the position of the camera in relation to the rig as a whole. Thus, by pushing both handles forward, the rods (and the camera mounted on the rods) may be slid forwards so that the camera tends to fall downwards on the pivoting rods. This action may be used by the cameraman when he wishes to have the camera at a low position in relation to his body, either for pointing the camera upwards from a low position, or to take a close-up image of an object close to the ground.

Figure 7:
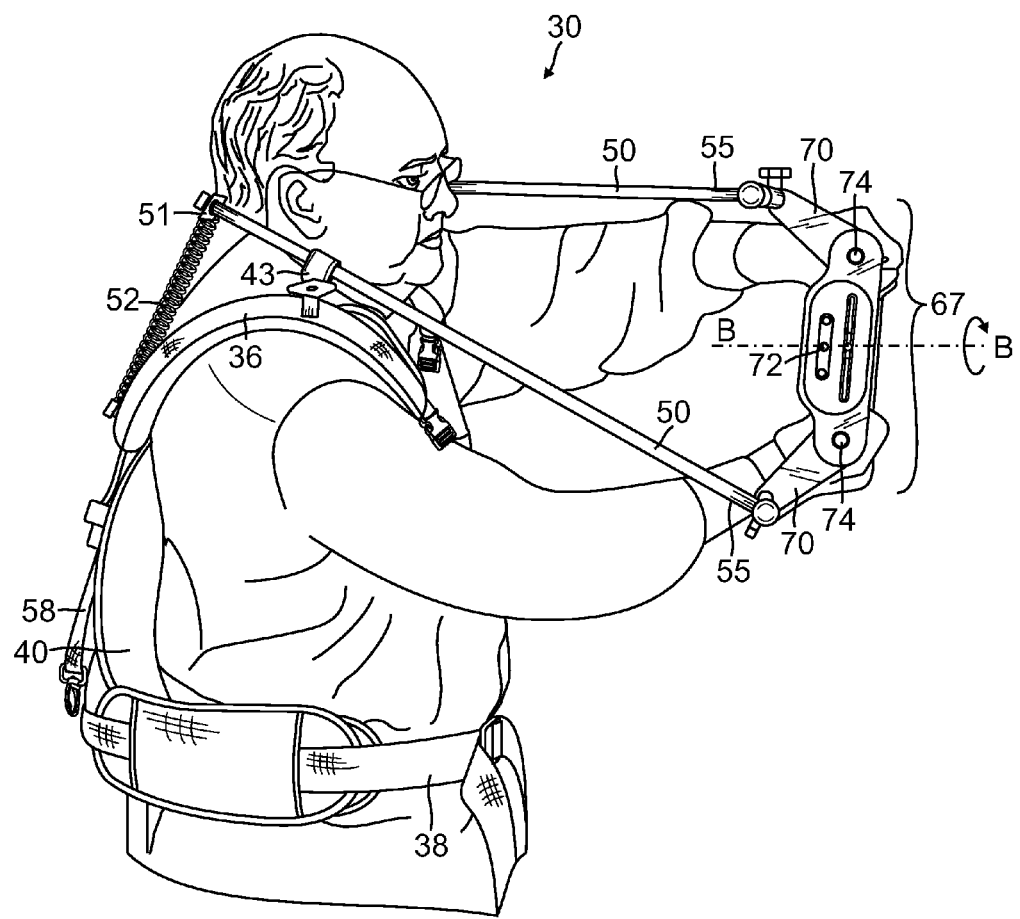
FIG. 7 is a perspective view of the apparatus of FIG. 1, shown in a fourth condition.

A fifth available function of the handles 76 is that they permit the cameraman to twist the rods "out of plane"— which is to say, he may pull one handle downwards, while pushing the other handle upwards so that the rods 50 rotate about the horizontally spaced pivots 43, with the result that the rods do not lie on any common plane. This effectively allows the cameraman to rotate the lens of the camera about an axis passing through the lens as indicated by arrow B in FIG. 7, without bending his body or moving one shoulder to a different level than the other. As may be seen in FIG. 7, the support structure 67 may be made to extend vertically, rather than horizontally as exemplified in FIG. 1. It will be appreciated that the angle of the camera support structure 67 may be aligned to any angle between horizontal and vertical, and in fact, the structure is capable of permitting the camera lens to rotate a full 180 degrees. In order for this twisted or "out of plane" configuration to be achieved, a number of advantageous aspects of the rig may be noted as contributing to the ease with which this achievement may be accomplished. First, is that the rods 50 (when the receivers 44 or sockets 44' are not locked) are permitted to twist about their axes while confined in the holes 45 of the slide receivers 44. Second, is that the rods 50 are permitted to slide backward or forward in the holes of the slide receivers 44 or sockets 44', so that the cameraman may select an appropriate length of each rod (not necessarily the same amount for each rod) to extend backwardly from the pivots 43, and thus achieve a desired amount of spring bias. Third, is that the back ends 51 of the rods may move up or down or sideways substantially independently of each other, thus allowing the back end of one rod to move upward and inwards while the back end of the other rod may, for example, move downward and inward, as may be envisaged with reference to FIG. 7. Fourth, is that the spring attached to the back end of one of the two rods acts independently of the spring attached to the back end of the other of two the rods, both in the vertical and in the horizontal vector components of each spring.

Under the thus described embodiments of the rig, the cameraman is afforded considerable advantages over prior art camera support systems. In addition to the advantages already described, the cameraman is able to orient his camera at an angle sideways from the forward direction of the rig 30, and then lock the support structure into the chosen shape by rotating the handles to lock the pins 74 which in turn lock the plates 70, 72 in relation to each other. This permits the cameraman to walk facing forward, thereby avoiding walking into vertical objects such as into trees, poles, and the like, while his camera points to the side and captures images to the side. Under prior art systems, the cameraman would have had to rotate his whole body sideways to orient the camera to a desired offset direction, thereby making it difficult for him or her to look forward, in the direction of motion. In extreme circumstances, such as in a war zone or other dangerous situation, the cameraman may even advance the camera, supported on the ends of the rods 50, beyond the corner of a building or structure while himself remaining safe behind the structure. The cameraman may set the angle of offset to ninety degrees (as exemplified in FIG. 4B) and film events taking place out of his direct view, but which may be visibly monitored by equipment such as a digital screen 34*a* (FIG. 1) which remains affixed to a front end of the horizontal rod 50, and which continues to face the cameraman for his easy reference and monitoring.

With reference to FIGS. 1 and 5, in some embodiments a spare plate 78 may be supplied and pinned by pins 79 to extend between lower ends of the two handles 76. The spare plate may be fitted with suitable holes and slots so that additional equipment, such as a battery pack 80 or the like (as exemplified in FIG. 1), may be supported by the rig 30. The spare plate 78 has the further functional advantage of stabilizing the two handles in relation to each other.

Furthermore, the presence and configuration of springs 52 at the back of pivoting support rods 50 has the advantageous feature of including springs that have a vertical force component, a horizontal force component, and that are therefore configured not only to lift the camera upwardly at the front end of the rods 50, but also to bias the front end of each rod outwardly, away from a line of symmetry of the rig. This has the advantage of assisting the cameraman to straighten out the camera support structure 67, and hence to align the plates 70,72 in the support structure into a straight line when desired. This feature has particular significance where a cameraman has caused the support structure to adopt a kinked shape such as seen in FIG. 4A to FIG. 4C, which he may have locked into a desired position. After unlocking the pins 74 in the support structure (by rotating the handles 76), the springs 52 at the back of the rig are configured, in some embodiments, to pull the front ends 55 of the rods outwardly and apart from each other, and thereby to automatically once again straighten the configuration of the support structure 67. It will be appreciated that the lateral movement of the rod ends 55, 51 that provides this advantage is made possible under the configuration of the present invention because of novel and useful features, including the fact that the back ends 51 of the rods are not connected to each other by any inflexible structure but are free to move laterally in relation to each other under the bias of the springs 52; and further, that the front ends 55 of the rods are operably connected to each other by a support structure that is capable of changing shape to be longer or shorter as desired.

Figure 9:
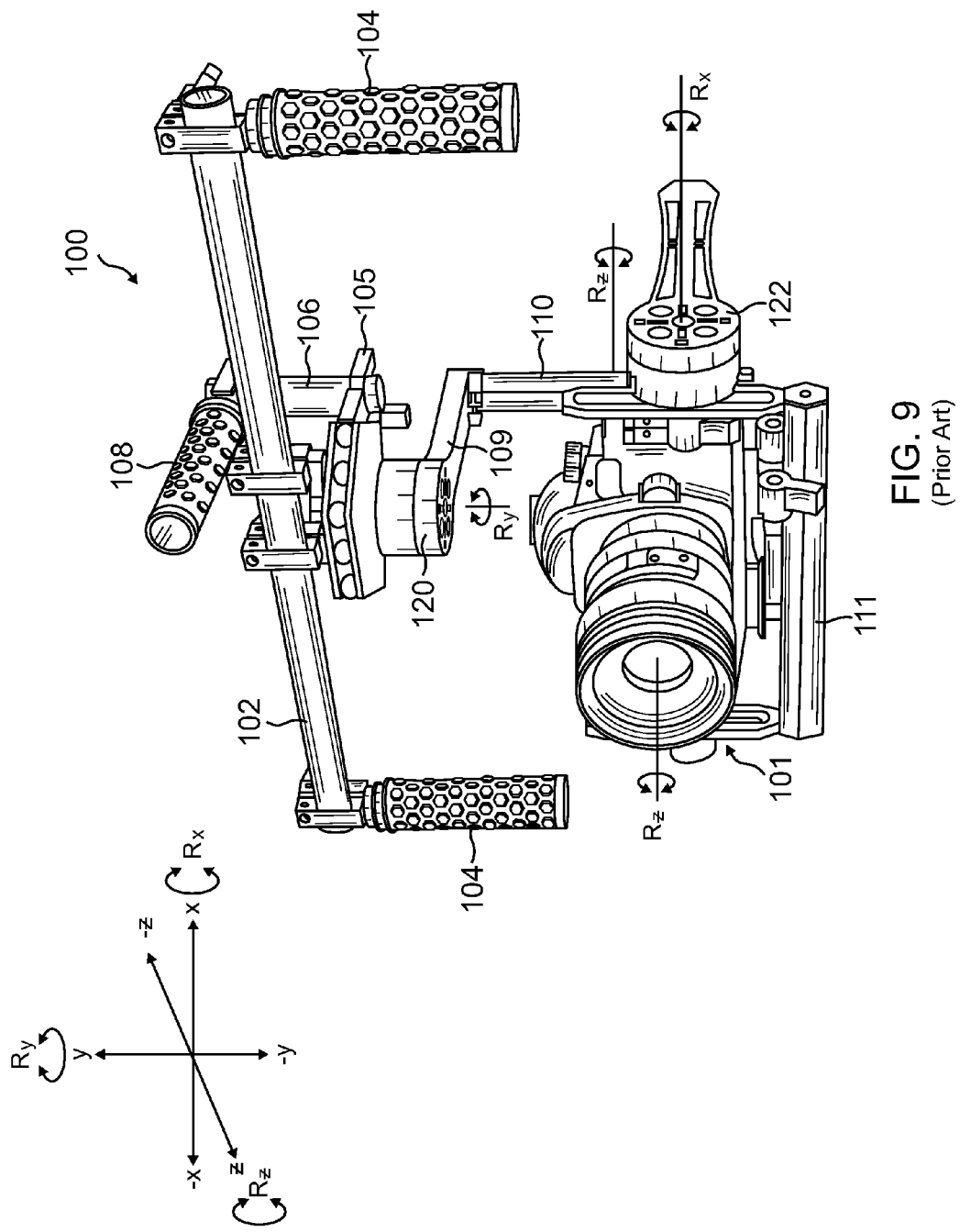
FIG. 9 is a perspective view of a camera mounted on a known gimbal system.

In another embodiment, the invention is configured to provide additional linear and rotational stability to a separate and known camera system that may include certain additional structures for reducing rotational movement of a camera. A known camera system which is typically identified as a "brushless gimbal controller system" (referred to hereinafter as a "gimbal system") has been introduced into the market for the movie industry. Such a gimbal system is exemplified in FIG. 9, under the reference numeral 100. A camera 101 is mounted on the gimbal system, and is interchangeable with other cameras to suit the situation. Typical components of a gimbal system include a horizontal bar 102, from which all or most other components depend. At the extremities of the horizontal bar, two vertical handles 104 descend downwards, although in other embodiments they may extend upwards. The handles 104 allow a user to carry the gimbal system in front of him using two hands, with the camera 101 facing forward. At the center point of the horizontal bar, a handle for single handed support is fixed. This single handle assumes a "U" shape formed from three bars, to include a horizontally extending first bar 105, a vertically extending second bar 106, and a horizontally extending third bar 108 which may function as a location for holding the entire gimbal system 100 by a single hand, and under which the center of gravity of the gimbal system 100 may lie. The rest of the gimbal system includes a number of orthogonally arranged vertical and horizontal bars e.g. 109, 110, 111. The camera is rigidly attached to one of the bars (in the example in FIG. 9, horizontal bar 111). At each of three critical joints between these orthogonally arranged bars, a brushless gimbal is inserted, in this case a first gimbal 120, about which the camera may derive rotation about the vertical axis, indicated by the arrow marked Ry; a second gimbal 122 about which the camera may derive rotation about the left to right horizontal axis, indicated by the arrow marked Rx; and a third gimbal which is not visible in FIG. 9 as it is behind the camera, about which the camera may derive rotation about the axis extending back and forth into the page, indicated by the arrow marked Rz.

By way of explanation, a gimbal is a pivoted support that allows the rotation of an object about a single axis. A set of three gimbals, one mounted in conjunction with the other with orthogonal pivot axes (the three orthogonal axes x, y, and z), may be used to allow an object mounted on the innermost gimbal to remain independent of the rotation of its support. In the present context, a brushless gimbal is a highly sophisticated form of known gimbal under operation of an electric motor that, simply put, with the aid of microprocessor systems, detects by inertial means any rotational motion imposed on the gimbal support. The gimbal motor then provides a rotational motion equal and opposite to that imposed on the gimbal support, so that the object attached to the gimbal (in this case, the camera) does not sense the imposed rotation or, effectively, feels a greatly reduced amount of the rotation imposed on the system 100. It should be noted that gimbals are not able to entirely reduce very large rotations that may be imposed, but typically are effective within an envelope of around 15 degrees of rotation. When three brushless gimbals are configured as described above with reference to the system 100 carrying the camera 101, the net effect is that a user may carry the system 100 bearing the camera at a run, and most of the rotational movement imposed on the system 100 by the user while he is running is not transmitted to the camera 101. In effect, the camera is isolated to a large extent from rotational movement by the orthogonally arranged brushless gimbals. This arrangement gives a resulting movie a very much more smooth sensation than compared to a movie taken without a gimbal support system. This effect is highly desirable in certain types of movie.

Problems arising in the use of the gimbal system 100, however, is that (a) it is not able to isolate the camera from linear movements, and (b) it is not able to isolate the camera from rotational movements which go beyond the envelope of rotational movements which the gimbal system is able to eliminate or suppress. Thus, sudden linear movements up and down, or sideways to the left and right, or backwards and forwards, are not reduced by the gimbal system 100. Large rotational movements are not reduced either. Such movements may not be highly noticeable if the scene being filmed is relatively far away from the camera, but they become more pronounced and noticeable when the scene is up close. Another problem arising from the use of a typical gimbal system 100 is that a photographer holding the system in front of him with two hands, or by a single hand, tends to become tired after a short while due to the combined weight of the system plus camera, and also because of the awkwardness of the position in which he is forced to hold the combination.

Figure 10:
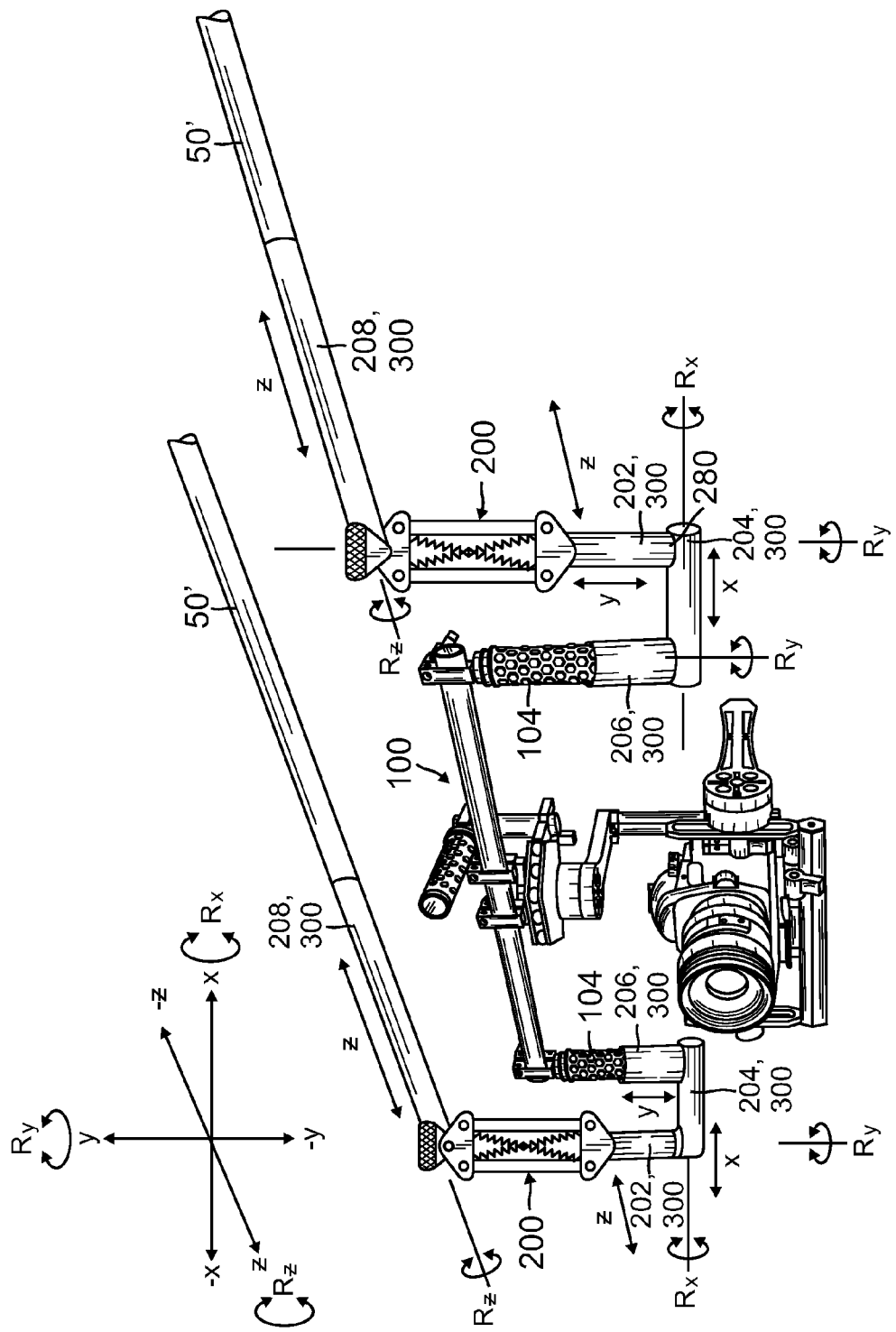
FIG. 10 is a perspective view of a further embodiment of the invention, configured for supporting a gimbal system.

Turning therefore to an embodiment of the invention, a "rig" having some of the features as those described with respect to earlier embodiments may be used to address some of the problems associated with a typical gimbal system. With reference to FIG. 10, it is shown how the two rods of a previous embodiment may be adapted and used to support a typical gimbal system 100, while at the same time reducing linear movements and excessive rotations that may be imposed on the gimbal system due to action of the photographer. The rods of this embodiment are identified by the numeral 50' to indicate that, in some embodiments, a modification may be made to the rods over previously described embodiments.

In some embodiments, at the front end of each rod 50' a four bar linkage 200 may be fixed to extend vertically. As may exemplified more clearly in FIGS. 13 and 14, the linkage 200 comprises four bars in rectangular configuration, two horizontal bars being an upper bar 230, and a lower bar 232, and a left vertical bar 234 and a right vertical bar 236. Preferably, each upper bar 230 is attached to the front end of each rod 50' with a rigid connection (for example, screwed or welded), allowing no pinned rotation between rod and upper bar. Each bar is pinned at each of two opposite ends by a pin joint 238 to allow deformation of the linkage from a rectangular configuration (as exemplified in FIG. 13), to a skew parallelogram configuration (as exemplified in FIG. 14). Diagonally opposed pins 238 are connected to each other by springs 240 (each spring preferably positioned adjacent an opposite face of the linkage) so that the springs tend to bias and restore any deformation in the linkage away from skew parallelogram back towards rectangular. As may exemplified in FIG. 14, any deformation away from rectangular form allows the two horizontal bars 230, 232 to maintain their horizontality. Therefore, any structure, e.g. structure 202, that is attached to the lower bar 232 and extends vertically, will continue to extend vertically throughout all deformations of the linkage 200. This is highly advantageous because it eliminates angular rotation of any structure that is, in turn, attached to a lower end of structure 202, as described more fully below.

Extending vertically from each linkage 200 is a y-axis aligned vertical stabilizer 202, whose internal operation is described more fully below. Extending inwardly (toward a vertical symmetry line of the rig) from the bottom end of each vertical stabilizer 202 may be positioned an x-axis aligned horizontal stabilizer 204, whose internal operation is described more fully below as following the same basic operation as the vertical stabilizer. Additionally, the front end of each rod 50' (and therefore extending forwards with respect to the cameraman), may be fitted with a z-axis stabilizer 208, whose internal operation is described more fully below, and follows the basic operation of both the vertical and the horizontal stabilizers. Extending vertically upward from the inward end of the horizontal stabilizer a cup 206 may be positioned, which has the form of an open cylinder configured to easily receive the downwardly extending handles 104 of the gimbal system 100. In some embodiments, the cup 206 may include the properties of a stabilizer, such as generic stabilizer 300 described herein below, while having an opening at an upper end of the stabilizer to receive the handles 104 of the gimbal system.

Figure 12:
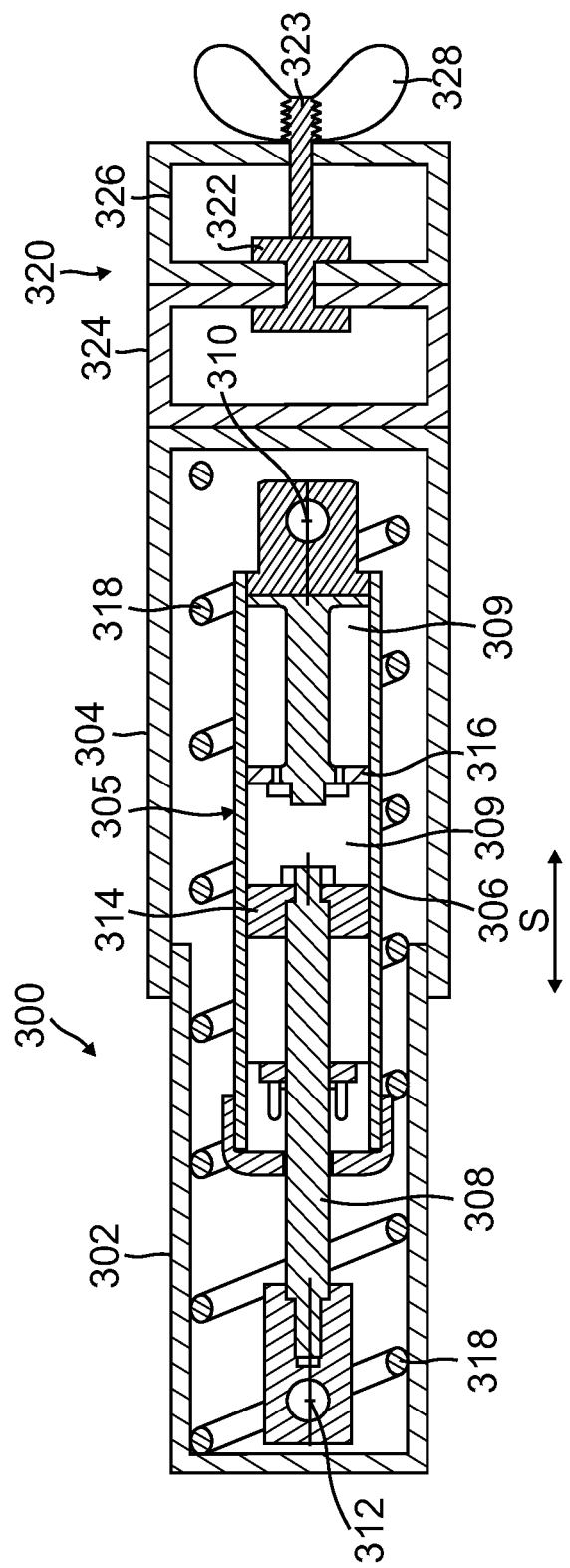
FIG. 12 is a sectional view of a component used in embodiments of the invention.

The vertical, horizontal and forward (i.e. x-, y-, and z-axis respectively) stabilizers 202, 204 and 208 (and also 206 in some embodiments) may all possess the same basic structure as the structure exemplified in FIG. 12, where there is shown a generic stabilizer identified by the numeral 300 of the kind that may be employed in the present invention. The generic stabilizer 300 comprises a first open ended cylinder 302 and a second open ended cylinder 304 that are sized to permit the first cylinder 302 to slidingly move in relation to the second cylinder 304.

Inside the two cylinders 302, 304 a dashpot 305 may be positioned. The dashpot is a known structure, comprising a cylinder 306 inside which a rod 308 is slidingly positioned. Fluid chambers 309 are defined inside the cylinder by structures that include a piston 314 attached to the tip of the rod, and a separator 316. The separator may have holes configured to allow fluid to pass therethrough in order to create fluid drag in a damping effect according to known principles. An exposed end of the rod 308 is pinned to the first cylinder at a first location 312, while the cylinder 306 is pinned to the second cylinder 304 at a second location 310, whereby sliding movement of the first cylinder in relation to the second cylinder causes sliding movement of the rod 308 in relation to cylinder 306. The chambers 309 are provided with hydraulic fluid so that movement of the rod 308 in relation to the cylinder 306 is damped by fluid flow between the chambers 309 via holes in the structure according to known principles. By "damping" it is meant to refer to an influence within or upon an oscillatory system that has the effect of reducing, restricting or preventing its oscillations through energy dissipation. In the example seen in FIG. 12, damping is caused by viscous drag of the fluid through the chambers according to known principles. While damping by fluid dashpot is applied in some embodiments of the invention, other embodiments may apply damping by way of energy dissipation through friction according to known principles.

Surrounding the dashpot 305 is a helical spring 318 configured to urge the first cylinder 302 and the second cylinder 304 into an equilibrium or registration position, in which position the first cylinder and second cylinder are separated by the same distance after each instance when movement between the first and second cylinders takes place. Thus, any oscillation or indeed any movement of the first cylinder in relation to the second cylinder will be damped by the dashpot 305, but after such movement the spring 318 will urge the two cylinders 320, 304 back to the equilibrium position, and hence will urge the rod 308 in cylinder 306 of the dashpot back to their starting positions in relation to each other. An additional feature of the dashpot 305, which is known in the art, is that the degree of damping of the dashpot may be altered by rotating the first cylinder 302 in relation to the second cylinder 304, which in turn rotates the rod 308 in relation to the cylinder 306 to adjust the size of the holes through which fluid must flow. Thus, the rate at which fluid may pass through the chambers is altered, thereby altering the degree of damping in one direction or the other, or both, by known principles.

A further feature of the stabilizer 300 is that, in some embodiments, on at least one end thereof, there may be positioned an axial swivel 320. The key feature of the swivel is a rotation pin 322 which is inserted into the stabilizer 300 along the central axis of the stabilizer. The rotation pin may pass through walls of an inner housing 324 and an outer housing 326 which are configured in relation to each other such that an inner housing 324 may be rigidly fixed to at least one of the first cylinder 302 or the second cylinder 304, while an outer housing 326 is located adjacent to the inner housing and may rotate about the pin 322 in relation to the inner housing while being substantially constrained against axial motion by the pin 322. A further feature in some embodiments is that the pin may include a threaded screw 323 which extends axially from the pin, through and outwardly of the outer housing 326. A nut 328 may be threaded onto an external threaded portion the screw 323, and is configured to allow adjustment by the cameraman. A wing type nut is suitable for this purpose. The pin 322 is provided with sufficient play so that, if the wing nut 328 is tightened against the outer housing, the outer housing 326 is compressed against the inner housing 324. By adjusting the degree of tightening, the user may introduce frictional damping into the rotation of the outer housing 326 around the pin 322. Alternatively, the user may tighten the wing nut to such an extent that all rotation between the outer housing 326 and inner housing 324 may be prevented by friction. This feature may be desirable when the user decides that the interconnected elements have become too flexible relative to each other, and he desires that some degrees of freedom to be temporarily reduced, or eliminated. However, in the general case, all the generic stabilizers 300 (such as stabilizers 202, 204, 208 and 206) may be set initially in all instances of their use to permit unrestrained axial and rotational degrees of freedom, and thereafter may be adjusted according the needs of the user.

Thus, it will be appreciated that any structural elements that are rigidly connected to each of the left and ends of the generic stabilizer 300 are separated from each other by the stabilizer 300. Under these conditions, such structural elements have, in relation to each other, an axial degree of freedom of movement between them along the longitudinal axis of the stabilizer that is (a) damped by the dashpot 305, and also (b) returned to a registration position along the axis by the spring 318. Furthermore, the dashpot may (c) be adjustable in its damping capacity, between ranges that effectively take the damping effect to zero on the one extreme (i.e. eliminating the effect of the dashpot), and to a locked condition on the other extreme where no relative axial movement is permitted. Furthermore, structural elements attached to each end of the stabilizer have (d) only one degree of rotational freedom between them, namely around the central longitudinal axis of the stabilizer, but (e) even this latter degree of freedom may be frictionally adjusted or "switched off" to a locked condition, as desired by tightening a screw element.

Figure 11:
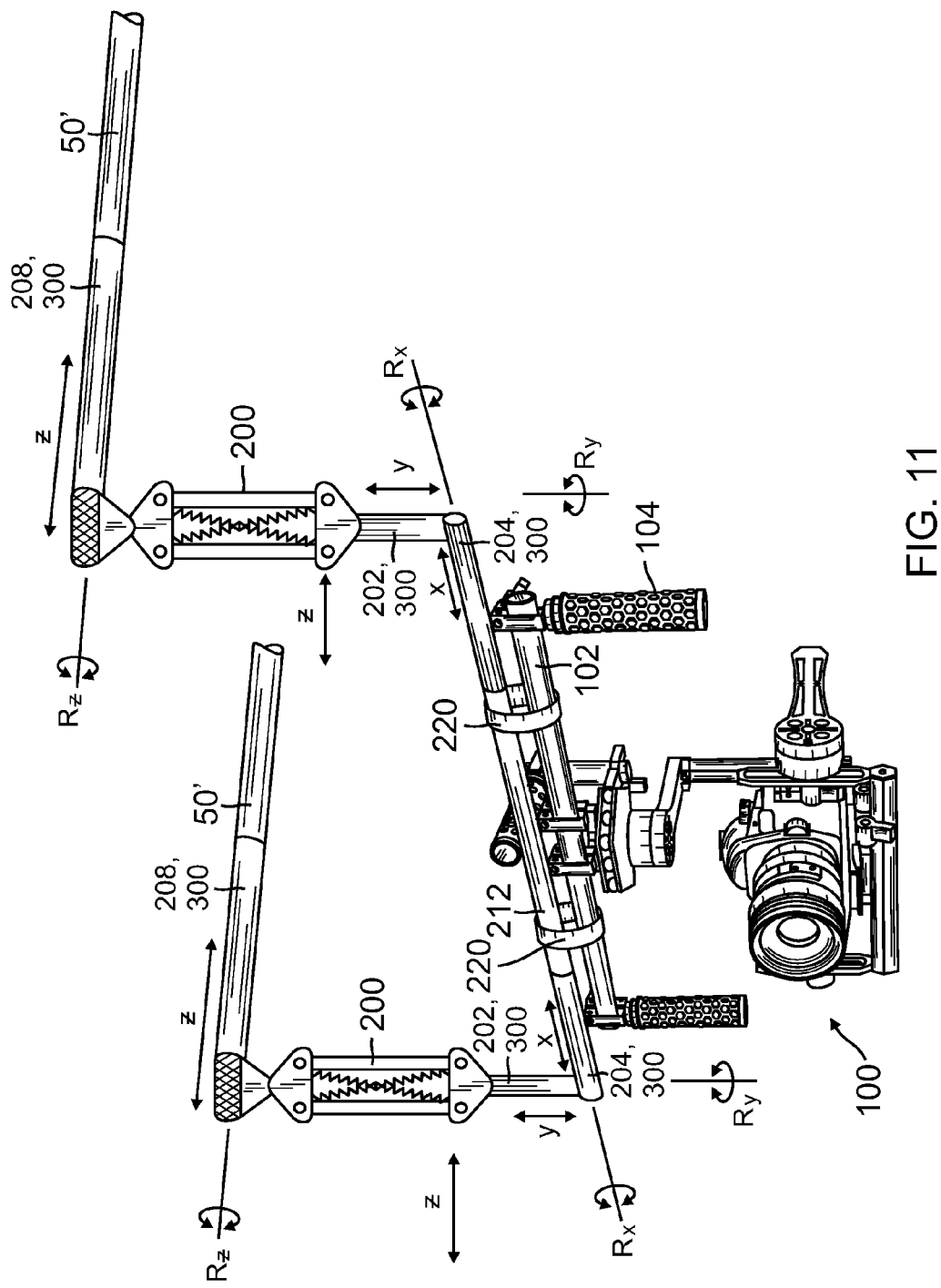
FIG. 11 is a perspective view of a yet further embodiment of the invention, configured for supporting a gimbal system.
Figure 15:
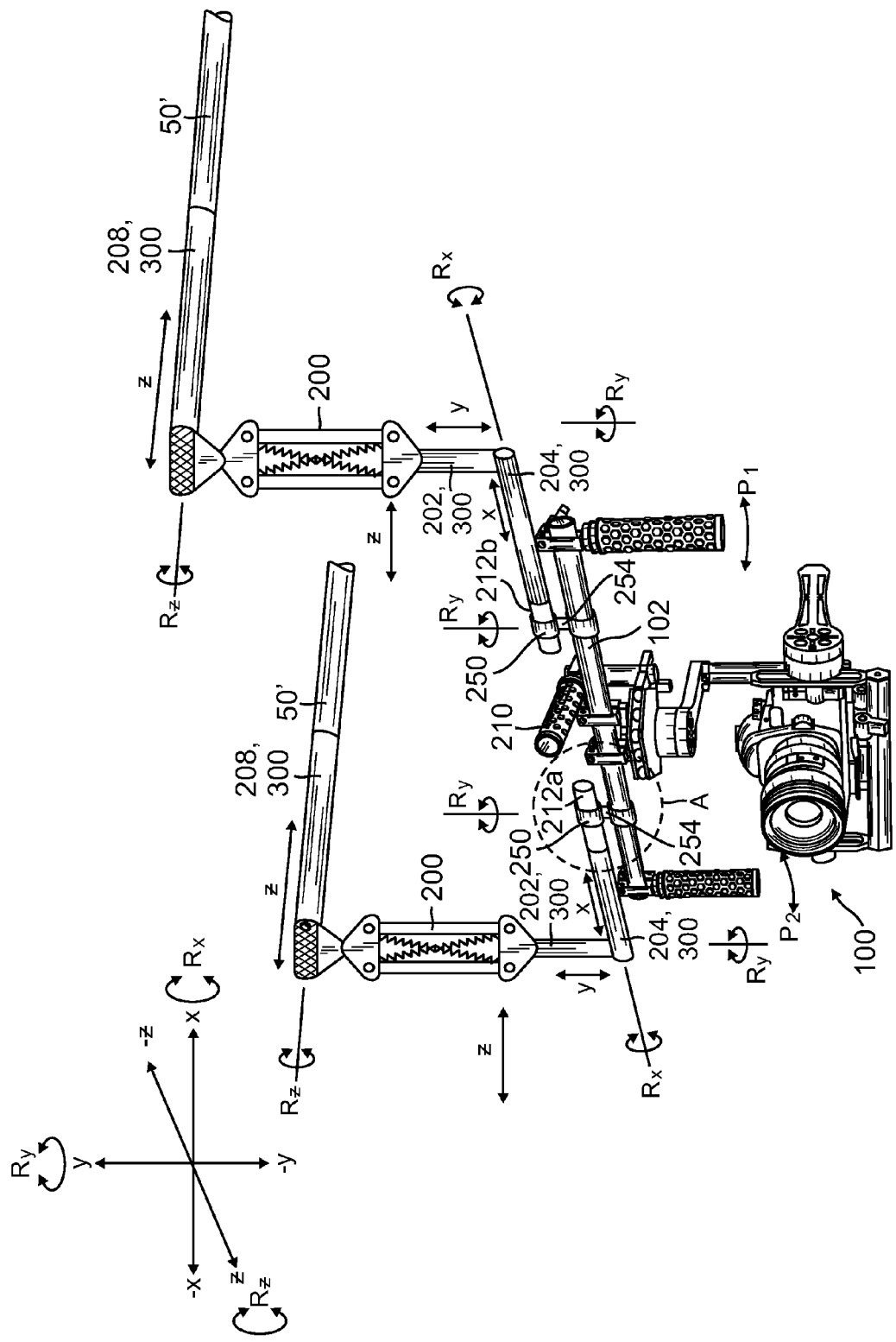
FIG. 15 is a perspective view of yet a further embodiment of the invention, configured for supporting a gimbal system.

As mentioned above, this generic stabilizer 300 may be used in each case where a stabilizer such as a stabilizer 202, 204, 208 or 206 is described herein. The terminal ends of the different stabilizers may be connected to each other, or to other structure, to form the rig support structure set out and exemplified in relation to in FIGS. 10, 11 and 15. Connections between terminal ends of the different stabilizers and adjoining structure may be achieved by any suitable connector which may include being formed by welding 280, screwing, pinning one to another, or to any component to which the stabilizer is to be affixed as described herein. As a matter of clarification, while FIGS. 10, 11, and 15 show the use of the generic stabilizer 300 in each instance where stabilizers 202, 204, 208 or 206 are shown, these figures do not expressly show the wing nut 328 which may be present on the stabilizer, merely to maintain clarity of these figures. In embodiments of the invention, the wing nut 328 may in fact be present in each case where a stabilizer, is used. By way of further clarification, FIGS. 10, 11, and 15 show the various degrees of freedom of movement that may be introduced by each stabilizer. In the case of linear degrees of freedom, these are shown by a linear double-headed arrow, accompanied by x, y, or z in association with each stabilizer respectively. In the case of rotational degrees of freedom, these are shown by a circular double headed arrow, accompanied by Rx, Ry, or Rz in association with each stabilizer respectively.

While the generic stabilizer 300 has been described as above in one embodiment, in other embodiments the generic stabilizer may be structured differently, and may include components that are nevertheless slidable in relation to each other and separated by a spring element configured to return the slidable elements to a registration position. A dashpot may be included in a different location than along the centerline of the stabilizer, and axial rotation of the slidable element in relation to the rig may be provided by means different than in the disclosed embodiment but which are configured to provide the same results as those disclosed.

Turning now to the operation of an embodiment of the invention, reference is initially made to FIG. 10. The rods 50' are initially placed over the shoulder of a user, as described more fully above with reference to the previous embodiment of a rig with its rods 50. The gimbal system 100 is then connected to the rig by inserting the handles 104 into upper openings in the cups 206, which impart firm vertical support to the entire gimbal system 100. Once thus connected, the rig and the gimbal system 100 form a structure extending from the front of one rod 50' to the front end of the other rod 50'. This structure is configured not to sag in the middle, but spans across the distance while supporting the camera. This allows the cameraman to rely on the rig to maintain a vertical support to the camera, while leaving his hands free to operate and direct the camera via the handles 104.

It will be appreciated that under this arrangement, as the cameraman moves forward with the rig and the gimbal system 100 connected as in FIG. 10, the gimbal system may tend to bounce up and down or backwards and forwards on the ends of the rods 50', and may even under some conditions develop a resonant vibration that may tend to increase if the natural frequency of vibration of the gimbal system matches the frequency of movement imparted by the moving cameraman. However, the left and right y-axis vertical stabilizers 202 (each including elements of the generic stabilizer 300) will operate to dampen any vertical movement of the gimbal system 100. The vertical stabilizers will extend and shorten in length as the first and second cylinders 302, 304 of those stabilizers slidingly move in relation to each other. Any relative movement that would otherwise tend to develop a resonance will be damped by the dashpot 305, and returned to a registration position in the vertical dimension, thus allowing the inertia of the gimbal system 100 to maintain a near constant height above the ground as the cameraman moves forward. (It will be appreciated that the gimbals in the gimbal system 100 alone are not able to provide any correction for a vertical linear vibration of the camera, because their capability is configured only to provide some limited correction to rotational movements.) Once any vertical resonant motion is eliminated, the spring 318 in the vertical stabilizer will return the slidable cylinders 302, 304 to their registration or equilibrium positions in relation to each other, so that the stabilizers 202 are ready to damp the next vertical movement or vibration of the rods 50' in relation to the gimbal system 100. In some embodiments, the dashpots may be set (according to the method described above) to have little or no effective damping, and damping may be provided by the cameraman who will have his hands on the handles 104 of the gimbal system 100, and may apply a degree of damping that is suitable for his needs. However, in this embodiment setting, the spring 318 in each stabilizer will return the stabilizer to its equilibrium position, thereby assisting the cameraman by providing a smooth return to vertical equilibrium position.

A similar effect is provided by the horizontal stabilizers 204 in the event that the rods 50' move suddenly laterally and horizontally in the x-direction. In this event, the horizontal stabilizers 204 damp out any lateral movement, allowing the camera to move forward substantially without registering any lateral movement. Again, it will be appreciated that the gimbals alone are not configured to reduce any linear horizontal lateral movement, and so the stabilizers of the invention are able to address this shortcoming.

Yet a further similar effect is provided by the z-axis stabilizers 208 in the event that front end of the rods 50' move suddenly backwards and forwards in the z-direction, in line with the axis of the rods 50'. Here again, the z-axis stabilizers absorb and dampen any oscillatory movement imparted to the gimbal system 100 in the z-direction in a similar way to the foregoing.

Finally, in some embodiments, a four bar linkage 200 may be provided to extend between the front end of the rods 50' and the vertical stabilizers 202. This linkage 200 may be provided in cases where very large z-axis (backwards and forwards) movements of the rods 50' are anticipated during movement by the cameraman, and such movement may be too large for the z-axis stabilizers 208 to accommodate. FIGS. 13 and 14 exemplify a four bar linkage 200 that includes an upper bar 230, a lower bar 232 opposite the upper bar 230, a left bar 234, and a right bar 236 opposite the left bar, all connected by pins at the corners of a rectangular configuration. Springs 240 connect the pins across diagonal corners of the linkage. With reference to FIG. 14, it will be understood that the four bar linkage 200 has the advantageous ability to deform in such a way that the lower bar 232 always remains parallel with the upper bar 230 under all deformations of the linkage. This means that the vertical stabilizer 202, connected to the lower surface of the lower bar, will always point vertically downwardly (or at least, it will maintain its previous vertical alignment) under all deformations of the linkage. Furthermore, because springs 240 connect two diagonals of the linkage, one spring will always be in tension, and will tend to restore the linkage to its square or registration condition, as exemplified in FIG. 13. Thus, in addition to z-axis stabilizers 208, or as an alternative thereto, the four bar linkages 200 suspended from the front end of the rods 50' are configured to permit large oscillating movement of the front end of the rods to occur without the same oscillating movement being transmitted downwardly to the camera and also, without any alteration of the vertical angle of the vertical stabilizers 202. Rather, the inertia of the camera and the gimbal system 100 maintain their own steady forward velocity and rotational alignment, while the front end of the rods are permitted to oscillate backwards and forwards independent of the camera's motion.

Thus, when a cameraman is running with the rig and gimbal system mounted over his shoulders, even if the front ends of the rods 50' tend to oscillate backwards and forwards, the camera will tend to maintain a steady and constant motion in the z-axis direction (i.e. forwards). The springs 240 in combination with the linkage 200 will deform, and will permit the rods to move in oscillation backwards and forwards, while the inertia of the gimbal system will tend to stabilize the motion of the camera in the z-axis direction. While the linkage 200 of the embodiment exemplified in the figures does not show a dashpot for damping resonant vibration, it is feasible to add a dashpot in combination with the springs of a kind similar to the generic stabilizer 300. However, the cameraman will have his hands on the handles 104 and cups 206, and may apply damping to any resonance, while allowing the linkage system to absorb any sudden movements backwards or forwards oscillatory movements.

In another embodiment, exemplified in FIG. 11, a result may be achieved that is similar to that of the embodiment shown in FIG. 10 by using varied structure. In this embodiment, a continuous bar 212 may be fixed between the two lateral stabilizers 204. From this bar, a gimbal system 100 is suspended by connectors 220 which in some embodiments may be straps which may include ring and loop structure (e.g. Velcro®) for rapid connection and disconnection of the gimbal system from the rig. Here, as in the previous embodiment, the rig is provided with structure that absorbs sudden x-axis, y-axis, and/or z-axis oscillatory movements by the cameraman through the front ends of the rods 50'.

Figure 17:
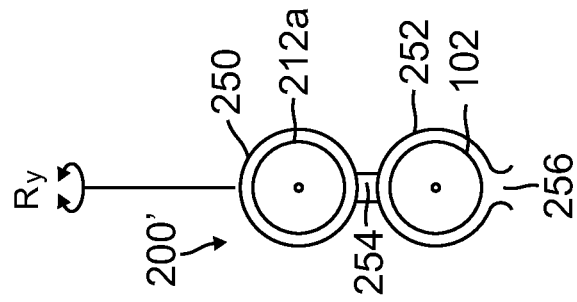
FIG. 17 is an end view, partially in section, of the detail shown in FIG. 16.
Figure 16:
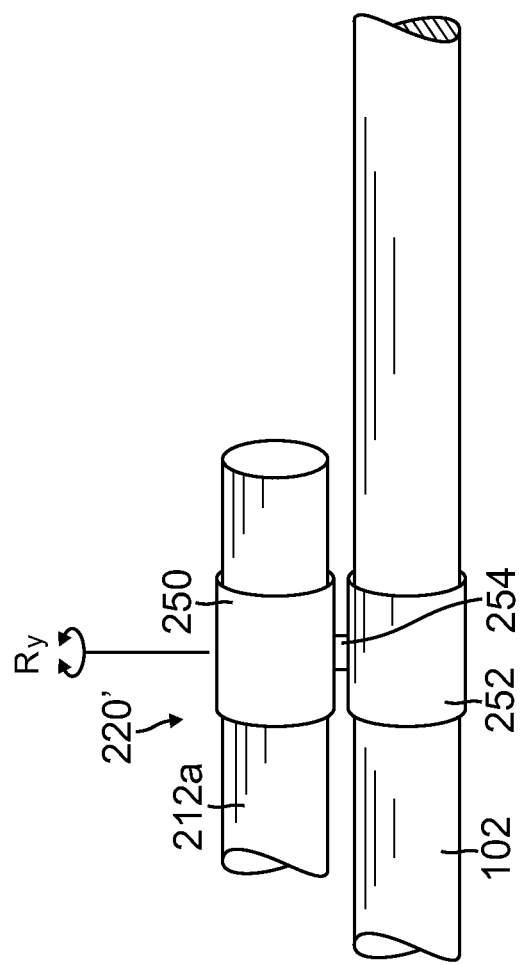
FIG. 16 is an elevational view of a detail of the embodiment shown in FIG. 15, generally identified in FIG. 15 by the symbol A.

In yet a further embodiment, exemplified in FIG. 15, a modification may be made to the embodiment exemplified in FIG. 11. Here, the horizontal bar 212 may be discontinued in a central portion so that only a left portion 212a and a right portion 212b of the horizontal bar remain. The resulting structure has three elements pin connected to each other, namely, left portion 212a, which is pinned to rod 102 of the gimbal system, which in turn is pinned to right portion 212b. In this embodiment, as exemplified in detail in FIGS. 16 and 17, connectors 220' are configured to provide a pin connection at the connection points so that the user may rotate the handles 104 of the gimbal system about a vertical axis (as indicated by the arrows P1 and P2) extending through the pins in order to rotate the axis of the camera about a vertical axis without causing the rods 50' to move horizontally. Thus, the cameraman may, without moving the rods, cause the camera to swivel horizontally left or right by moving the handles 104 of the gimbal. With reference to FIGS. 16 and 17, it is exemplified that a permanent collar 250 may be fixed to left hand portion 212a, a temporary snap fit collar 252 with an opening 256 in its lower circumference may receive the horizontal rod 102 of the gimbal system 100, and a pin 254 may connect the two collars 250, 252 together to allow the left portion 212a and the horizontal rod 102 to rotate relative to each other in a horizontal plane. (The same kind of pinned connection applies to the right portion 212b, which is connected to the horizontal rod 102.) It will be appreciated that this embodiment has features of the embodiment in FIGS. 4A-4C, where three elements are connected to each other by two vertical extending pin connections to extend horizontally between the front ends of the rods, in order to afford the cameraman the ability to rotate the camera lens by an angle Q in a horizontal plane about its vertical axis, while the rods 50' point forwardly without any necessary motion.

Figure 18:
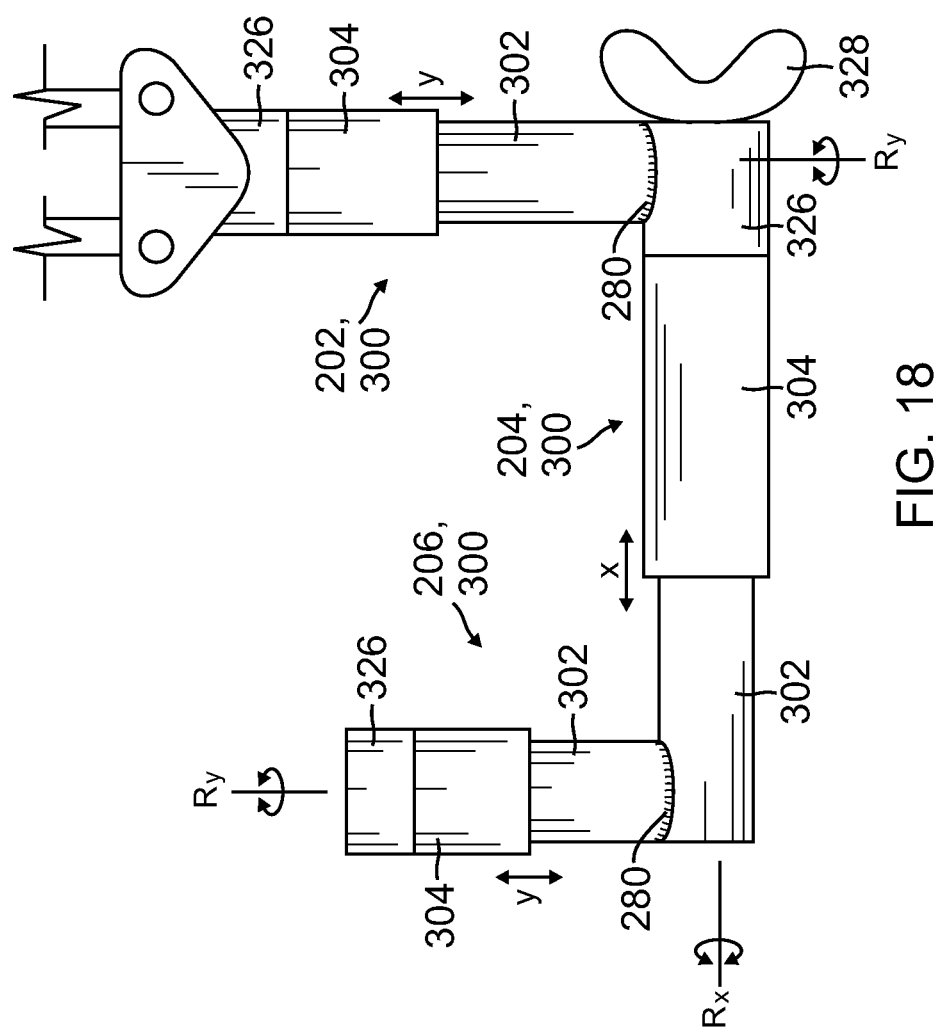
FIG. 18 is an elevational view of a detail of the embodiment in FIG. 10.
Figure 19:
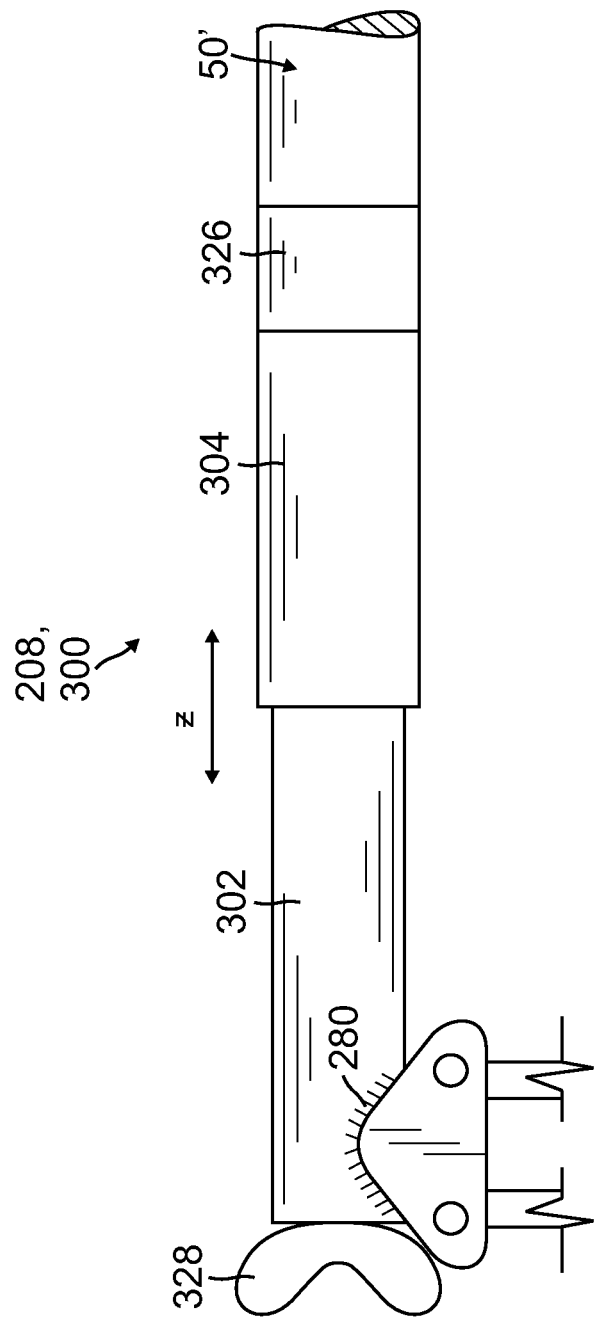
FIG. 19 is an elevational view of a detail of the embodiments in FIGS. 10, 11, and 15.

For further clarification, FIGS. 18 and 19 show details of some embodiments. FIG. 18 exemplifies how generic stabilizers (in this case, stabilizers 202, 204, 206) may be connected to each other and to other structural elements, in this case by welds 280 although any connective means will suffice. In each case, the first cylinder 302 and second cylinder 304 of each generic stabilizer are allowed to slidingly move in relation to each other, despite being connected to other structure. Also, the outer housing 326 of a generic stabilizer remains free to rotate in relation to the balance of the stabilizer, despite being connected to other structure. FIG. 19 exemplifies how a generic stabilizer (in this case, stabilizer 208) is connected to rods 50' and also to other structure of the rig. Again, the first cylinder 302 and second cylinder 304 remain free to slide axially in relation to each other. Also, outer housing 326 remains free to rotate in relation to the balance of the stabilizer 208. The double headed arrows associated with "x" and "y" and "z" indicate a sliding degree of freedom existing between the cylinders 302 and 304. The double headed arrows associated with Rx, Ry, and Rz indicate a rotating degree of freedom existing between the cylinders 302, 304 on the one hand, and housing 326 on the other hand.

Thus, the various embodiments of the system for camera stabilization provides an advantageous structure for easily manipulating a camera in active and stressful situations. The present invention may, of course, be carried out in other specific ways than those herein set forth without departing from the essential characteristics of the invention. For example, while the foregoing embodiments describe a rig that may be used with a gimbal system, it is entirely within the scope of the invention to use the rig described herein with a simple camera mounted on a horizontal support structure, without any gimbals. The present embodiments are, therefore, to be considered in all respects as illustrative and not restrictive, while the scope of the invention is set forth in the claims that follow.

I claim:

1. A rig for supporting a camera comprising:
   two shoulder supports, each shoulder support being configured to fit over a shoulder of a user;
   a left rod and a right rod, each rod extending generally forwards and having a front end and a back end,
   wherein, each rod is located to pivotingly rotate about one of two pivots located between the front end and the back end of each rod respectively, each pivot being supported by a respective shoulder support;
   wherein each rod is configured to be operably connected to the other rod via a support structure that is configured for supporting a camera, each rod having a sliding element configured to operably connect each rod to the support structure, each sliding element being configured to be moveable towards and, alternatingly, away from the back end;

further wherein, each rod is equipped with a spring positioned to bias each sliding element toward a registration position in relation to the back end, so that forward movement of the sliding element from the registration position develops a backward bias in the spring, and backward movement of the sliding element from the registration position develops a forward bias in the spring;

further wherein each rod is configured so that each sliding element is free to rotate in relation to the back end about an axis extending along the rod.

2. The rig of claim 1, further wherein each rod is equipped with a dashpot positioned in parallel with each spring, whereby each dashpot is configured to damp motion of the sliding element in relation to the registration position.

3. The rig of claim 1, wherein each sliding element includes a cylinder.

4. A rig for supporting a camera comprising:
two shoulder supports, each shoulder support being configured to fit over a shoulder of a user;
a left rod and a right rod, each rod extending generally forwards and having a front end and a back end;
wherein, each rod is located to pivotingly rotate about one of two pivots located between the front end and the back end of each rod respectively, each pivot being supported by a respective shoulder support;
wherein each rod is configured to be operably connected to the other rod via a support structure that is configured for supporting a camera;
a left vertical extension and a right vertical extension, each vertical extension having a first end and a second end and being operably connected to each respective rod via the first end, each vertical extension having a sliding element configured to be moveable towards and, alternatingly, away from the first end, each sliding element being configured to operably connect to the support structure;
wherein, each vertical extension is equipped with a spring positioned to bias each sliding element toward a registration position in relation to the first end, so that downward movement of the sliding element from the registration position develops an upward bias in the spring, and upward movement of the sliding element from the registration position develops a downward bias in the spring.

5. The rig of claim 4, further wherein each vertical extension is equipped with a dashpot positioned in parallel with each spring, whereby each dashpot is configured to damp motion of the sliding element in relation to the registration position.

6. The rig of claim 4, wherein each vertical extension is configured so that each sliding element is free to rotate in relation to the first end about an axis extending along the vertical extension.

7. The rig of claim 4, wherein each sliding element includes a cylinder.

8. A rig for supporting a camera comprising:
two shoulder supports, each shoulder support being configured to fit over a shoulder of a user;
a left rod and a right rod, each rod extending generally forwards and having a front end and a back end;
wherein, each rod is located to pivotingly rotate about one of two pivots located between the front end and the back end of each rod respectively, each pivot being supported by a respective shoulder support;
wherein each rod is configured to be operably connected to the other rod via a support structure that is configured for supporting a camera;
a left horizontal extension and a right horizontal extension, each horizontal extension operably connected to each front end, each horizontal extension extending horizontally toward a point between the two rods and having an inside end which is proximate to the point and an outside end which is remote from the point, each horizontal extension having a sliding element configured to be moveable towards and, alternatingly, away from the outside end, each sliding element being configured to operably connect to the support structure;
wherein, each horizontal extension is equipped with a spring positioned to bias each sliding element toward a registration position in relation to the outside end, so that outward movement of the sliding element from the registration position develops an inward bias in the spring, and inward movement from the registration position develops an outward bias in the spring.

9. The rig of claim 8, further wherein each horizontal extension is equipped with a dashpot positioned in parallel with each spring, whereby each dashpot is configured to damp motion of the sliding element in relation to the registration position.

10. The rig of claim 8, wherein each horizontal extension is configured so that each sliding element is free to rotate in relation to each respective outside end about an axis extending along the horizontal extension.

11. The rig of claim 8, wherein each sliding element includes a cylinder.

12. The rig of claim 8, further including a left cup and a right cup, each cup connected to each respective horizontal extension and having an opening configured to receive a handle of the support structure.

13. A rig for supporting a camera comprising:
two shoulder supports, each shoulder support being configured to fit over a shoulder of a user;
a left rod and a right rod, each rod extending generally forwards and having a front end and a back end;
wherein, each rod is located to pivotingly rotate about one of two pivots located between the front end and the back end of each rod respectively, each pivot being supported by a respective shoulder support;
wherein the front end of each rod is configured to be operably connected to the front end of the other rod via a support structure that is configured for supporting a camera;
a left vertical element and a right vertical element operably connected to each front end respectively, each vertical element having a first end and a second end, each vertical element operably connected at the first end to a respective rod via a pin joint to permit the vertical element to pivotingly rotate in a plane extending vertically and backwards and forwards;
wherein the left vertical element and the right vertical element each include a four bar linkage; and
wherein the support structure is operably connected to the second end of each vertical element.

14. The rig of claim 13 wherein each four bar linkage includes at least one spring configured to bias the four bar linkage toward a rectangular configuration.

15. The rig of claim 13, further including a left horizontal extension and a right horizontal extension, each horizontal extension operably connected to the second end of each vertical element respectively, each horizontal extension being configured to be free to rotate in relation to each respective vertical extension about an axis extending along the horizontal extension.

16. The rig of claim 15, further including a left cup and a right cup, each cup connected to each respective horizontal extension and having an opening configured to receive a handle of the support structure.

17. The rig of claim 16, wherein each cup is configured to be free to rotate in relation to each respective horizontal extension about an axis extending longitudinally along the cup.

* * * * *